United States Patent
Jin et al.

(10) Patent No.: US 12,524,033 B2
(45) Date of Patent: Jan. 13, 2026

(54) METHODS FOR DESIGNING HIGH FREEDOM PARAMETERIZED FREQUENCY-MODULATED CODED WAVEFORM

(71) Applicant: NANJING UNIVERSITY OF AERONAUTICS AND ASTRONAUTICS, Jiangsu (CN)

(72) Inventors: Guodong Jin, Nanjing (CN); Xifeng Zhang, Nanjing (CN); Daiyin Zhu, Nanjing (CN); Jingkai Huang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 19/097,839

(22) Filed: Apr. 1, 2025

(65) Prior Publication Data
US 2025/0231579 A1    Jul. 17, 2025

Related U.S. Application Data

(63) Continuation-in-part of application No. PCT/CN2024/089203, filed on Apr. 22, 2024.

(30) Foreign Application Priority Data

Feb. 28, 2023 (CN) .......................... 202310177241.2

(51) Int. Cl.
*G06F 1/02*    (2006.01)
*G01S 13/34*    (2006.01)

(52) U.S. Cl.
CPC ............... *G06F 1/02* (2013.01); *G01S 13/34* (2013.01)

(58) Field of Classification Search
CPC ........ G01S 13/34; G01S 13/583; G01S 13/88; G01S 13/93–931; G06F 1/02
See application file for complete search history.

(56) References Cited

U.S. PATENT DOCUMENTS 7,880,672 B1    2/2011 Doerry
10,948,579 B2 *    3/2021 Wang ..................... G06N 3/126
(Continued)

FOREIGN PATENT DOCUMENTS

CN    106093876 A    11/2016
CN    112748403 A    5/2021
(Continued)

OTHER PUBLICATIONS

International Search Report in PCT/CN2024/089203 mailed on Jul. 17, 2024, 7 pages.
(Continued)

*Primary Examiner* — Matthew D Sandifer
(74) *Attorney, Agent, or Firm* — PORUS IP LLC

(57) ABSTRACT

The embodiments of the present disclosure provide a method for designing a high freedom parameterized frequency-modulated coded waveform, comprising: S1: obtaining a frequency-modulated coded vector; S2: selecting a coding model order to be utilized; S3: obtaining an parameterized instantaneous frequency function of a signal based on the frequency-modulated coded vector and the coding model order, integrating the parameterized instantaneous frequency function to obtain a phase of the signal, and generating the high freedom parameterized frequency-modulated coded waveform. Embodiments of the present disclosure provide a high freedom parameterized frequency-modulated coded waveform. The waveform has a continuous phase function, precise spectral control, and is config-
(Continued)

ured to have a parameterized frequency-modulated waveform with high freedom.

5 Claims, 13 Drawing Sheets

(56) References Cited

U.S. PATENT DOCUMENTS

2019/0293774 A1  9/2019  Jin et al.
2019/0383925 A1  12/2019  Gulati et al.

FOREIGN PATENT DOCUMENTS

| CN | 114966551 A | 8/2022 |
| CN | 116520250 A | 8/2023 |
| EP | 3144701 A1 | 3/2017 |

OTHER PUBLICATIONS

Written Opinion in PCT/CN2024/089203 mailed on Jul. 17, 2024, 9 pages.

* cited by examiner

①: Ideal phase-coded waveform
②: PCFM waveform
③: Zero-order parameterized frequency-modulated waveform
④: First-order parameterized frequency-modulated waveform
⑤: Second-order parameterized frequency-modulated waveform
⑥: Hybrid-order parameterized frequency-modulated waveform ①: Ideal phase-coded waveform
②: PCFM waveform
③: Zero-order parameterized frequency-modulated waveform
④: First-order parameterized frequency-modulated waveform
⑤: Second-order parameterized frequency-modulated waveform
⑥: Hybrid-order parameterized frequency-modulated waveform ①: Ideal phase-coded waveform ②: PCFM waveform ③: Zero-order parameterized frequency-modulated waveform ④: First-order parameterized frequency-modulated waveform ⑤: Second-order parameterized frequency-modulated waveform ⑥: Hybrid-order parameterized frequency-modulated waveform ①: Ideal phase-coded waveform
②: PCFM waveform
③: Zero-order parameterized frequency-modulated waveform
④: First-order parameterized frequency-modulated waveform
⑤: Second-order parameterized frequency-modulated waveform
⑥: Hybrid-order parameterized frequency-modulated waveform ①: Ideal phase-coded waveform ②: PCFM waveform ③: Zero-order parameterized frequency-modulated waveform ④: First-order parameterized frequency-modulated waveform ⑤: Second-order parameterized frequency-modulated waveform ⑥: Hybrid-order parameterized frequency-modulated waveform

METHODS FOR DESIGNING HIGH FREEDOM PARAMETERIZED FREQUENCY-MODULATED CODED WAVEFORM

CROSS-REFERENCE TO RELATED APPLICATIONS

This application is a continuation-in-part of International Application No. PCT/CN2024/089203 filed on Apr. 22, 2024, which claims priority to Chinese Patent Application No. 202310177241.2, filed on Feb. 28, 2023, the entire content of each of which is hereby incorporated by reference.

TECHNICAL FIELD

The present disclosure relates to the field of signal processing, and in particular, to a method for designing high freedom parameterized frequency-modulated coded waveform.

BACKGROUND

Waveform design is an important portion of a radar system, which determines radar performance such as range resolution and anti-interference capability. Therefore, the waveform design of radar has become a research hotspot in recent years. Existing radar waveforms are categorized into random noise waveforms, phase-coded waveforms, and frequency-modulated waveforms. Among them, the amplitude modulation of noise waveforms is not suitable for high-power radar, while phase-coded waveforms and frequency-modulated waveforms are the primary subjects of current research.

SUMMARY

The present disclosure provides a method for designing a high freedom parameterized frequency-modulated coded waveform. The method comprises: step S1: obtaining a frequency-modulated coded vector; step S2: selecting a coding model order to be utilized; step S3: obtaining an instantaneous frequency function of a signal based on the frequency-modulated coded vector and the coding model order, integrating the instantaneous frequency function of the signal to obtain a phase of the signal and generate the high freedom parameterized frequency-modulated coded waveform, wherein the step S1 includes: obtaining a parameterized frequency-modulated waveform having a constant amplitude and M sub-pulses, a bandwidth and a pulse width of the parameterized frequency-modulated waveform being B and T, respectively; determining a power spectrum of the parameterized frequency-modulated waveform by selecting a target window function; generating a set of waveforms based on a principle of stationary phase; sampling an instantaneous frequency function of the set of waveforms to acquire the frequency-modulated coded vector $\zeta=[\zeta_0, \zeta_1, \ldots, \zeta_M]$; determining a start frequency point and a termination frequency point of each of the set of sub-pulses in the parameterized frequency-modulated waveform based on the frequency-modulated coded vector, a value of M being in a range from 1 to a time-bandwidth product, the coding model order is an order of a strike curve of each sub-pulse frequency in the high freedom parameterized frequency-modulated coded waveform, in response to selecting a zero-order coding model, each sub-pulse frequency in the high freedom parameterized frequency-modulated coded waveform is a constant value, in response to selecting a first-order coding model, each sub-pulse frequency in the high freedom parameterized frequency-modulated coded waveform has a linear relationship with time, in response to selecting a second-order coding model, each sub-pulse frequency in the high freedom parameterized frequency-modulated coded waveform has a quadratic relationship with the time, in response to selecting a hybrid-order coding model, each sub-pulse frequency in the high freedom parameterized frequency-modulated coded waveform is constant value, or has a linear relationship with the time, or has a quadratic relationship with the time.

BRIEF DESCRIPTION OF THE DRAWINGS

The present disclosure will be further described by way of exemplary embodiments, which will be detailed with reference to the accompanying drawings. These embodiments are not intended to be limiting. In these embodiments, the same reference numerals denote the same structures, wherein.

DETAILED DESCRIPTION

Figure 1:
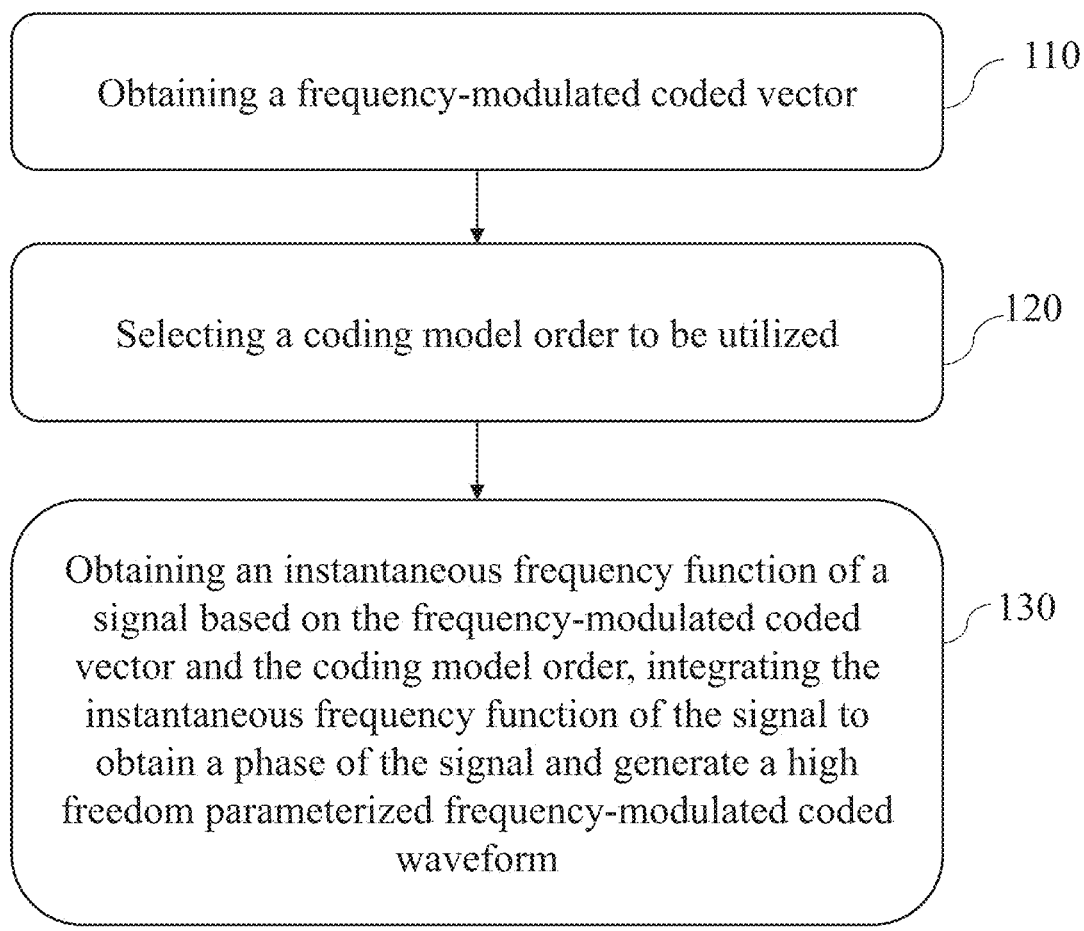
FIG. 1 is a flowchart of an exemplary process for designing a high freedom parameterized frequency-modulated coded waveform according to some embodiments of the present disclosure.

In order to more clearly illustrate the technical solutions of the embodiments of the present disclosure, a brief introduction to the drawings used in the description of the embodiments is provided below. It is apparent that the drawings described below are merely some examples or embodiments of the present disclosure. For those skilled in the art, the present disclosure may also be applied to other similar scenarios based on these drawings without inventive effort. Unless apparent from the context or otherwise specified, the same reference numerals in the figures denote the same structures or operations.

It should be understood that the terms "system," "device," "unit," and/or "module" used herein are methods for distinguishing different components, elements, parts, sections, or assemblies at different levels. However, if other terms can achieve the same purpose, those terms may be used as substitutes.

As indicated in the present disclosure and the claims, unless explicitly stated otherwise in the context, terms such as "a," "an," "one," and/or "the" are not specifically limited to the singular form and may also include the plural form. Generally, the terms "comprising" and "including" indicate the inclusion of explicitly identified steps and elements, but these steps and elements do not constitute an exclusive listing. The method or device may also include other steps or elements.

Flowcharts are used in the present disclosure to illustrate the operations performed by the system according to the embodiments of the present disclosure. It should be understood that the preceding or subsequent operations are not necessarily performed in the exact order. On the contrary, the steps may be processed in reverse order or simultaneously. At the same time, other operations may be added to these processes, or one or more steps may be removed from these processes.

An ideal phase-coded waveform includes a plurality of continuous, constant-amplitude sub-pulses controlled by a phase-coded vector, such as Barker codes and polyphase codes. The parameterized mathematical model of an ideal phase-coded waveform is concise and has been widely applied in the field of radar. However, the waveform has an issue of instantaneous phase jumps, leading to high spectral sidelobes. The hardware at the radar transmitter filters out the spectral sidelobes, causing energy loss, which is unfavorable for the application of the ideal phase-coded waveform in high-power radar system.

A frequency-modulated waveform is a radar signal with excellent performance, obtained by designing an instantaneous frequency function. One type of frequency-modulated waveform is the Costas-coded waveform. The Costas-coded waveform is a frequency-hopping coded waveform composed of a plurality of sub-pulses with different frequencies, where the frequencies of the sub-pulses hop according to a specific sequence. The frequency-modulated waveform includes a linear frequency-modulated (LFM) waveform and a nonlinear frequency-modulated (NLFM) waveform. The frequency of the LFM waveform varies linearly with time. The frequency of the NLFM waveform varies nonlinearly with time. The NLFM waveform is configured to design an instantaneous frequency function to construct a power spectral density (PSD) function of the signal, thereby reducing the sidelobes of the matched filter output without losing the signal-to-noise ratio (SNR). The linear frequency-modulated (LFM) waveform with a continuous instantaneous phase function is a type of nonlinear frequency-modulated waveform. The NLFM waveform has a continuous phase function and a controllable spectrum and has been widely applied in airborne and spaceborne synthetic aperture radar (SAR) systems. However, the NLFM waveform is limited by the selected window function, and further performance improvement remains challenging. In addition, the NLFM waveform lacks parameterized coding capability, which affects its flexibility and constrains its development.

Professor Blunt proposed the polyphase-coded frequency modulation (PCFM) waveform, which transforms polyphase coding into an NLFM waveform through a continuous phase function, effectively reducing spectral sidelobes. However, while the PCFM waveform utilizes the continuity of the phase function to avoid high spectral sidelobes, it requires frequency template error (FTE) measurement to assist in precise spectral control, resulting in high computational complexity, which affects practical applications.

Therefore, a method for designing a high freedom parameterized frequency-modulated coded waveform is needed. The method ensures phase continuity, precise spectral control, and parameterized coding capability while reducing sidelobes and minimizing mismatch loss, making the waveform suitable for the high-performance radar systems.

In some embodiments, the radar system includes a waveform generator, a radar transmitter, a radar receiver, and a processing device.

The waveform generator is configured to generate a waveform required for radar wave transmission. The radar wave is an electromagnetic wave used for target detection. For example, the waveform generator may include components such as a digital-to-analog converter, a low-power modulator, a mixer, an attenuator, a frequency divider, and an oscillator.

The radar transmitter is configured to transmit radar waves. For example, the radar transmitter may include a high-power modulator, a power amplifier, a transmit filter, and a driver amplifier.

In some embodiments, the radar transmitter may transmit radar waves according to the high freedom parameterized frequency-modulated coded waveform generated by the waveform generator.

The radar receiver is configured to receive radar waves. For example, the radar receiver may include a low-noise amplifier, a filter, a mixer, and a demodulator to enhance echo signals and suppress noise.

In some embodiments, after the radar transmitter transmits radar waves, the radar waves may illuminate a target object, and a portion of the radar waves may be reflected back. The radar receiver may receive the reflected radar waves.

In some embodiments, the processing device may process data and/or information obtained from various components of the radar system and/or external data sources. In some embodiments, the processing device may execute program instructions based on the data, information, and/or processing results to perform one or more functions described in the present disclosure. For example, the waveform generator may obtain the parameterized instantaneous frequency function of a signal based on the frequency-modulated coded vector and the coding model order, integrate the parameterized instantaneous frequency function to obtain a phase of the signal, and generate the high freedom parameterized frequency-modulated coded waveform.

In some embodiments, the processing device may be a single server or a server cluster. The server group may be centralized or distributed. In some embodiments, the processing device may be local or remote. In some embodiments, the processing device may be implemented on a cloud platform. Merely by way of example, the cloud platform may include a private cloud, a public cloud, a hybrid cloud, a community cloud, a distributed cloud, an internal cloud, a multilayer cloud, or any combination thereof. In some embodiments, the processing device may be a field-programmable gate array (FPGA) or a digital signal processor (DSP). In some embodiments, the processing device may be integrated into or installed on one or more of the waveform generator, the radar transmitter, and/or the radar receiver.

In some embodiments, the radar system may further include a storage device and an interactive device.

The storage device may store data or information generated by other devices. For example, the storage device may store the frequency-modulated coded vector and the coding model order. In some embodiments, the storage device may include one or more storage components, each of which may be a standalone device or a part of another device. The storage device may be local or implemented via the cloud. In some embodiments, the storage device may include a mass storage device, a removable storage device, a volatile read-write memory, a read-only memory (ROM), or any combination thereof. In some embodiments, the storage device may be implemented on a cloud platform.

The interactive device refers to a device in the radar system that interacts with users or technical personnel and displays the high freedom parameterized frequency-modulated coded waveform. For example, after the radar system receives radar waves reflected by a target object through the radar receiver, the processing device may perform parameter extraction to obtain relevant parameters of the target object, such as distance, size, and flight speed, and display them in real-time on the interactive device in the form of images or data.

In some embodiments, the processing device may refresh a display image of the interactive device to simultaneously display the high freedom parameterized frequency-modulated coded waveform and the update coded waveform. More descriptions may be found in the relevant description of FIG. 1 in the present disclosure.

FIG. 1 is a flowchart of an exemplary process for designing a high freedom parameterized frequency-modulated coded waveform according to some embodiments of the present disclosure. In some embodiments, process 100 may be executed by the processing device in the waveform generator.

In some embodiments, a method for designing a high freedom parameterized frequency-modulated coded waveform comprises: obtaining a frequency-modulated coded vector; selecting a coding model order to be utilized; obtaining an instantaneous frequency function (also referred to in the present disclosure as parameterized instantaneous frequency function) of a signal based on the frequency-modulated coded vector and the coding model order, integrating the parameterized instantaneous frequency function of the signal to obtain a phase of the signal and generate the high freedom parameterized frequency-modulated coded waveform.

In 110, the frequency-modulated coded vector is obtained.

The frequency-modulated coded vector refers to a vector composed of a plurality of coded values. Each coded value of the frequency-modulated coded vector corresponds to a frequency point of the signal, namely the frequency value of the signal at a specific time point, which is configured to control the overall trend of the signal frequency. In some embodiments, the coded values in the frequency-modulated coded vector may reflect the variation of the frequency values of each sub-pulse over time.

In some embodiments, the processing device may obtain a parameterized frequency-modulated waveform having a constant amplitude and M sub-pulses, where the bandwidth and pulse width of the parameterized frequency-modulated waveform are B and T, respectively; determine a power spectrum of the parameterized frequency-modulated waveform by selecting a target window function; generate a set of waveforms based on a principle of stationary phase; sample an instantaneous frequency function (also referred to in the present disclosure as initial instantaneous frequency function) of the set of waveforms to acquire the frequency-modulated coded vector.

The parameterized frequency-modulated waveform has a dynamically adjustable parameter set, enabling waveform characteristics (such as a bandwidth, a frequency modulation pattern, and a sidelobe level) to be optimized or reconfigured in real-time based on specific requirements. A sub-pulse refers to a segmented unit of the parameterized frequency-modulated waveform in the time domain.

In some embodiments, the count of M sub-pulses may be pre-constructed based on prior knowledge.

In some embodiments, the count of M sub-pulses may be determined based on the bandwidth, the pulse width, the time-bandwidth product, and the coding model order. More descriptions may be found in FIGS. 9-10 and the related descriptions.

A frequency-modulated waveform refers to a radar signal waveform in which the instantaneous frequency varies over time. In some embodiments, the variation of the instantaneous frequency of the parameterized frequency-modulated waveform may be adjusted through coded values.

In some embodiments, the bandwidth and the pulse width of the parameterized frequency-modulated waveform are B and T, respectively. The B bandwidth refers to the frequency range occupied by the radar signal and may represent the interval between the lowest and highest frequencies of the parameterized frequency-modulated waveform. The T pulse width refers to the duration of the radar signal in the time domain and may represent the time length from the start to the end of the parameterized frequency-modulated waveform.

In some embodiments, the processing device may pre-construct an initial signal based on the requirements of technical personnel. For example, the processing device may pre-construct a frequency-modulated signal with a constant amplitude and ensure that the initial signal maintains a relatively constant amplitude within the T pulse width. The processing device may divide the waveform into a plurality of M sub-pulses based on the T pulse width to obtain the parameterized frequency-modulated waveform, with the bandwidth and the pulse width being B and T, respectively.

The target window function refers to a mathematical function configured to control the power spectrum distribution of the parameterized frequency-modulated waveform.

In some embodiments, the processing device may pre-select the target window function based on the requirements of technical personnel. For example, the target window function may be selected from a Hanning window, a Kaiser window, or the like.

The power spectrum refers to a power distribution of the radar signal across different frequencies.

In some embodiments, the processing device may determine the power spectrum of the signal by selecting the target window function.

In some embodiments, the processing device may compute the NLFM waveform using the principle of stationary phase (POSP). For example, the processing device may determine the power spectrum of the signal by selecting the target window function and obtain a desired NLFM waveform using POSP.

In some embodiments, the processing device may obtain the parameterized frequency-modulated waveform having a constant amplitude and M sub-pulses, where the bandwidth and pulse width of the parameterized frequency-modulated waveform are B and T respectively. Based on a selected target window function, the power spectrum of the signal is determined, and the POSP method is utilized to generate a desired NLFM waveform. Based on the selected target window function, the power spectrum of the signal is determined, and the desired NLFM waveform is generated using POSP. By performing M+1 point sampling on the initial instantaneous frequency function of the NLFM waveform, the frequency-modulated coded vector of the high freedom parameterized frequency-modulated coded waveform can be obtained. The frequency-modulated coded vector may be expressed by the following equation (1):

$$\zeta = [\zeta_0, \zeta_1, \ldots, \zeta_M] \tag{1}$$

wherein, $\zeta$ represents the frequency-modulated coded vector, $\zeta_M$ represents the coding value of the M th sub-pulse, and the value range of M is from 1 to the time-bandwidth product. Each element in $\zeta$ has a value range of $[-B/2, B/2]$, where B represents the bandwidth of the parameterized frequency-modulated waveform, ensuring that the spectrum of each sub-pulse does not exceed the bandwidth limitation.

The initial instantaneous frequency function refers to an unparameterized fundamental function. In some embodiments, the initial instantaneous frequency function may reflect a frequency variation pattern of an original frequency-modulated waveform. The original frequency-modulated waveform refers to the NLFM waveform generated by the processing device based on the principle of stationary phase (POSP). The frequency-modulated coded vector obtained by sampling retains only discrete frequency points of frequency variation.

In some embodiments, the frequency-modulated coded vector may reflect the maximum and minimum values that the signal frequency may reach, i.e., the signal bandwidth. In some embodiments, each coding value of the frequency-modulated coded vector corresponds to a frequency point of the signal and may control an overall trend of the signal frequency.

In some embodiments, the processing device may determine a start frequency point and a termination frequency point of each sub-pulse in the parameterized frequency-modulated waveform based on the frequency-modulated coded vector. The start frequency point and the termination frequency point refer to a start value and an end value of frequency variation of each sub-pulse. The start frequency point and the termination frequency point respectively represent a frequency start point and a frequency end point of a sub-pulse in time, which are used to describe a frequency variation range of the sub-pulse.

In some embodiments, the processing device may determine the start frequency point and the termination frequency point of each sub-pulse in the parameterized frequency-modulated waveform based on the frequency-modulated coded vector. For example, the processing device may determine the coding value of the m−1 th sub-pulse in the frequency-modulated coded vector as the start frequency point of the m th sub-pulse, and determine the coding value of the m th sub-pulse in the frequency-modulated coded vector as the termination frequency point of the m th sub-pulse.

In 120, the coding model order to be utilized is selected.

The coding model order refers to an order of a strike curve of each sub-pulse frequency in the high freedom parameterized frequency-modulated coded waveform that is ultimately expected to be obtained. For example, the coding model order may include a zero order (i.e., using a zero-order coding model), a first order (i.e., using a first-order coding model), a second order (i.e., using a second-order coding model), and a hybrid order (i.e., using a plurality of coding models with different orders), or the like.

In some embodiments, the processing device may, by default, select a zero-order coding model, a first-order coding model, a second-order coding model, a hybrid-order coding model, or a higher-order coding model based on requirements of a technical person. For example, the zero-order coding model is suitable for requirements with low computational complexity.

The sub-pulse frequency refers to a frequency of each sub-pulse in the high freedom parameterized frequency-modulated coded waveform during its duration.

In some embodiments, the zero-order coding model may indicate that the sub-pulse frequency remains constant throughout the entire duration.

In some embodiments, in response to selecting a zero-order coding model, each sub-pulse frequency in the high freedom parameterized frequency-modulated coded waveform is a constant value, and a frequency hop occurs between sub-pulses.

In some embodiments, the first-order coding model may indicate that the sub-pulse frequency varies linearly with time, forming a linear frequency-modulated waveform.

In some embodiments, in response to selecting a first-order coding model, each sub-pulse frequency in the high freedom parameterized frequency-modulated coded waveform has a linear relationship with time.

In some embodiments, the second-order coding model may indicate that the sub-pulse frequency varies quadratically with time, forming a nonlinear frequency-modulated waveform.

In some embodiments, in response to selecting the second-order coding model, each sub-pulse frequency in the high freedom parameterized frequency-modulated coded waveform has a quadratic relationship with time, and the frequency between sub-pulses is continuous.

The hybrid-order coding model refers to a combination of the zero-order coding model, the first-order coding model, and the second-order coding model.

In some embodiments, in response to selecting the hybrid-order coding model, each sub-pulse frequency in the high freedom parameterized frequency-modulated coded waveform is a constant value, or has a linear relationship with time, or has a quadratic relationship with time.

In 130, an instantaneous frequency function of the signal (also referred to as a parameterized instantaneous frequency function) is obtained based on the frequency-modulated coded vector and the coding model order, the parameterized instantaneous frequency function is integrated to obtain a phase of the signal and generate the high freedom parameterized frequency-modulated coded waveform is generated.

The parameterized instantaneous frequency function may reflect a new frequency variation pattern constructed based on the coding values in the frequency-modulated coded vector. In some embodiments, the parameterized instantaneous frequency function may represent a relationship between the instantaneous frequency of the signal and time.

The initial instantaneous frequency function refers to an initial, unparameterized function. In some embodiments, the initial instantaneous frequency function may be used to generate the frequency-modulated coded vector. The parameterized instantaneous frequency function refers to a parameterized function generated based on the frequency-modulated coded vector and the coding model order. In some embodiments, the parameterized instantaneous frequency function may be used to generate the final high freedom parameterized frequency-modulated coded waveform.

In some embodiments, the processing device may output the coding parameter based on the start frequency point and the termination frequency point of each sub-pulse in the parameterized frequency-modulated waveform and the order of the strike curve of each sub-pulse frequency in the high freedom parameterized frequency-modulated coded waveform; the parameterized instantaneous frequency function of the signal is obtained based on the coding parameter; the parameterized instantaneous frequency function is integrated to obtain the phase of the signal, and the high freedom parameterized frequency-modulated coded waveform corresponding to the selected coding model order is generated.

The coding parameter refers to a parameter determined based on the coding values in the frequency-modulated coded vector. The coding parameter may include a frequency value, a chirp rate, and a frequency modulation acceleration.

In some embodiments, the processing device may determine the coding parameter based on the selected coding model order (zero-order, first-order, second-order, or hybrid-order).

In some embodiments, the processing device may obtain expressions of the parameterized instantaneous frequency function under different orders.

For example, in response to selecting a zero-order coding model, the processing device may represent the parameterized instantaneous frequency function using the following equation (2):

$$f_0(t'; \zeta) = \sum_{m=1}^{M} c_m rect\left(\frac{t' - (m-1)T_p - T_p/2}{T_p}\right) \quad (2)$$

wherein, $T_p = T/M$ represents the pulse width of a sub-pulse, $f_0(t'; \zeta)$ denotes the parameterized instantaneous frequency function of the zero-order high freedom parameterized frequency-modulated coded waveform, and the coding parameter $c_m = \zeta_m$ represents the frequency value of the mth sub-pulse. The function rect(t) represents a rectangular window function. In some embodiments, the frequency value $c_m$ of the mth sub-pulse and the rectangular window function rect(t) may be expressed by the following equation (3) and equation (4), respectively:

$$c_m = \zeta_m, \zeta_1 = \zeta_0, m = 1, \ldots, M, \quad (3)$$

$$rect(t) = \begin{cases} 1, & -0.5 \le t \le 0.5 \\ 0, & t < -0.5 \text{ or } t > 0.5 \end{cases} \quad (4)$$

For example, when the first-order coding model is selected, the parameterized instantaneous frequency function of the first-order high freedom parameterized frequency-modulated coded waveform may be expressed by the following equation (5):

$$f_1(t'; \zeta) = \int_0^{t'} \sum_{m=1}^{M} b_m rect\left(\frac{t'' - (m-1)T_p - T_p/2}{T_p}\right) dt'' + \zeta_0 \quad (5)$$

wherein, $f_1(t'; \zeta)$ represents the parameterized instantaneous frequency function of the first-order high freedom parameterized frequency-modulated coded waveform, the coding parameter $b_m = (\zeta_m - \zeta_{m-1})/T_p$ represents the chirp rate of the mth sub-pulse, and $t''$ represents a variable. In some embodiments, the coding parameter $b_m$ may be expressed by the following equation (6):

$$b_m = \frac{(\zeta_m - \zeta_{m-1})}{T_p}, m = 1, \ldots, M \quad (6)$$

wherein, $b_m$ represents the chirp rate of the mth sub-pulse. The relationship between the coding frequency point and the chirp rate may be expressed by the following equation (7):

$$\zeta_m = T_p b_m + \zeta_{m-1}, m = 1, \ldots, M. \quad (7)$$

For example, when the second-order coding model is selected, the parameterized instantaneous frequency function of the second-order high freedom parameterized frequency-modulated coded waveform may be expressed by the following equation (8):

$$f_2(t'; \zeta) = \int_0^{t'} \int_0^{t''} \sum_{m=1}^{M} a_m rect\left(\frac{t''' - (m-1)T_p - T_p/2}{T_p}\right) dt''' dt'' + \zeta_0 \quad (8)$$

wherein, $f_2(t'; \zeta)$ represents the parameterized instantaneous frequency function of the second-order high freedom parameterized frequency-modulated coded waveform, and $a_m$ represents the coding parameter. In some embodiments, the coding parameter $a_m$ may be expressed by the following equation (9):

$$a_m = \frac{2(\zeta_m - \zeta_{m-1})}{T_p^2} \quad (9)$$

wherein, the coding parameter $a_m$ represents the frequency modulation acceleration of the mth sub-pulse. The relationship between the coding frequency point and the frequency modulation acceleration may be expressed by the following equation (10):

$$\zeta_m = T_p^2 \frac{a_m}{2} + \zeta_{m-1}, m = 1, \ldots, M. \quad (10)$$

For example, the processing device may integrate waveforms of different orders as described above. In this case, the parameterized instantaneous frequency function of the hybrid-order frequency-modulated waveform may be expressed by the following equation (11):

$$f_k(t'; \zeta) = \int_0^{t'} \int_0^{t''} \sum_{m=1}^{M} a_m' rect\left(\frac{t''' - (m-1)T_p - T_p/2}{T_p}\right) dt''' + \int_0^{t'} \sum_{m=1}^{M} b_m' rect\left(\frac{t'' - (m-1)T_p - T_p/2}{T_p}\right) dt'' + \sum_{m=1}^{\lceil t'/T_p \rceil} c_m' + \zeta_0 \quad (11)$$

wherein, $a'_m$, $b'_m$ and $c'_m$ are coding parameters, representing the frequency modulation acceleration, chirp rate, and frequency value of the sub-pulse, respectively.

In some embodiments, since $a'_m$, $b'_m$ and $c'_m$ in equation (11) may have different values, the processing device may define respective allowable value ranges to ensure the desired spectral content, as expressed by equation (12):

$$c'_m \in [-B, B], b'_m \in \left[-\frac{B}{T_p}, \frac{B}{T_p}\right], a'_m \in \left[-\frac{6B}{T_p^2}, \frac{6B}{T_p^2}\right], m = 1, \ldots, M \quad (12)$$

wherein, the relationship between the coding frequency point and $a'_m$, $b'_m$ and $c'_m$ may be expressed by equation (13):

$$\zeta_m = T_p^2 \frac{a'_m}{2} + T_p b'_m + c'_m + \zeta_{m-1}, m = 1, \ldots, M. \quad (13)$$

Therefore, based on the above equations (2)-(13), the processing device may calculate the corresponding parameterized instantaneous frequency function using the sampled frequency-modulated coded vector and the selected coding model order, integrate the parameterized instantaneous frequency function of the signal to obtain the phase of the signal, and ultimately generate the high freedom parameterized frequency-modulated coded waveform.

The phase of the signal refers to a periodic state of the signal at a certain moment. In some embodiments, the phase of the signal may be represented in angles, reflecting the relative position of the signal waveform within a period. In some embodiments, the phase of the signal may reflect the instantaneous state of the signal. For example, in frequency modulation (FM) or phase modulation (PM) signals, changes in phase directly carry modulation information.

In some embodiments, the processing device may obtain the phase of the signal by integrating the parameterized instantaneous frequency function.

In some embodiments, the processing device may generate the high freedom parameterized frequency-modulated coded waveform in various ways. For example, the high freedom parameterized frequency-modulated coded waveform may be expressed by the following equation (14):

$$s_k(t;\zeta) = \exp\left\{j\left(2\pi \int_0^t f_k(t';\zeta)dt' + \theta_k\right)\right\}, k = \{0, 1, 2, 3\} \quad (14)$$

wherein, $s_k(t;\zeta)$ represents the high freedom parameterized frequency-modulated coded waveform, where k={0,1,2,3} corresponds to the zero-order high freedom parameterized frequency-modulated coded waveform, the first-order high freedom parameterized frequency-modulated coded waveform, the second-order high freedom parameterized frequency-modulated coded waveform, and the hybrid-order high freedom parameterized frequency-modulated coded waveform, respectively. $f_k(t';\zeta)$ represents the parameterized instantaneous frequency function of the high freedom parameterized frequency-modulated coded waveform, and $\theta_k$ represents the initial phase value of the high freedom parameterized frequency-modulated coded waveform.

In some embodiments, the processing device may further generate the high freedom parameterized frequency-modulated coded waveform based on a target sub-pulse count. More descriptions regarding the target sub-pulse count may be found in FIG. 9 and related descriptions thereof.

In some embodiments of the present disclosure, by adopting a parameterized frequency-modulated coding approach, zero-order, first-order, second-order, and hybrid-order models are supported, allowing the processing device to flexibly adjust waveform characteristics based on actual requirements. By directly modeling and computing the parameterized instantaneous frequency function, high-precision power spectrum control can be achieved without the need for additional frequency template error optimization, thereby reducing computational complexity. Moreover, by integrating the instantaneous frequency function to obtain the phase of the signal, computational load is reduced, improving signal processing efficiency.

In some embodiments of the present disclosure, the generated high freedom parameterized frequency-modulated coded waveform simultaneously possesses a continuous phase function, precise spectral control, and a parameterizable coding structure. Furthermore, the high freedom parameterized frequency-modulated coded waveform achieves higher in-band energy accumulation, lower autocorrelation sidelobes, and smaller mismatch loss. Additionally, compared to the ideal phase-coded waveforms and PCFM waveforms, some embodiments of the present disclosure can achieve superior waveform performance using far fewer sub-pulses than the count of sub-pulses required for ideal phase-coded waveforms and PCFM waveforms.

It should be noted that the above description of process 100 is merely for illustration and explanation, and does not limit the scope of the present disclosure. For a person skilled in the art, various modifications and changes may be made to process 100 under the guidance of the present disclosure. However, these modifications and changes still fall within the scope of the present disclosure.

In some embodiments, the processing device may generate a target bandwidth based on the bandwidth, the pulse width, the time-bandwidth product, and the coding model order; determine a proportional relationship between the target bandwidth and the bandwidth of the parameterized frequency-modulated waveform as a bandwidth ratio; adjust a parameter range of the coding parameter based on the bandwidth ratio to determine an update parameter range; generate an update coded waveform based on the update parameter range; refresh a display image of an interactive device to simultaneously display the high freedom parameterized frequency-modulated coded waveform and the update coded waveform; and in response to a waveform difference between the high freedom parameterized frequency-modulated coded waveform and the update coded waveform being greater than a predetermined difference threshold, adjust a scanning range of a radar receiver of the radar system based on the waveform difference.

The target bandwidth is the spectral range of target sub-pulse(s) in the frequency domain. The target sub-pulse(s) refer to the sub-pulse(s) randomly selected from the parameterized frequency-modulated waveform based on the target sub-pulse count. In some embodiments, the processing device may randomly select one or more sub-pulses from the parameterized frequency-modulated waveform to form the target sub-pulse(s). For example, the selection method of the target sub-pulse(s) may include random sampling, uniform sampling, or the like.

In some embodiments, the processing device may analyze the frequency domain of the target sub-pulse(s) to obtain the target bandwidth. In some embodiments, the processing device may analyze the frequency domain of the sub-pulses in the parameterized frequency-modulated waveform to obtain the bandwidth of the parameterized frequency-modulated waveform.

The bandwidth ratio refers to the ratio of the target bandwidth of the target sub-pulse(s) to the bandwidth of the parameterized frequency-modulated waveform. The processing device may determine the bandwidth ratio based on the ratio between the target bandwidth and the bandwidth of the parameterized frequency-modulated waveform.

The parameter range refers to the range of values for the coding parameters. For example, the parameter range may correspond to the value ranges of $a'_m$, $b'_m$ and $c'_m$, where $a'_m$, $b'_m$ and $c'_m$ represent the frequency modulation acceleration, chirp rate, and frequency value of the sub-pulse, respectively. More descriptions regarding the coding parameter may be found in the above content and related descriptions thereof.

In some embodiments, the processing device may adjust the parameter range of the coding parameter based on the bandwidth ratio to determine the update parameter range. For example, the processing device may retrieve historical waveform data from a storage device of a radar system. Historical waveform data with the same coding model order as the current coding model order (e.g., zero-order, first-order, second-order, or hybrid-order) may be obtained, and historical waveform data that meets preset conditions may be selected. The parameter range of the corresponding coding parameters in the historical waveform data that meets the preset conditions may be determined as the updated parameter range.

The preset condition may be that the historical peak sidelobe ratio (PSLR) of the selected historical waveform data is lower than the target peak sidelobe ratio and that the bandwidth ratio of the historical waveform data is most similar to the determined bandwidth ratio. In some embodiments, the processing device may determine the target peak sidelobe ratio based on the current coding model order by querying a lookup table. The lookup table may include target peak sidelobe ratios corresponding to different coding model orders. The lookup table may be pre-constructed based on historical data or prior knowledge. The most similar bandwidth ratio refers to the case where the difference between the bandwidth ratio of the historical waveform data and the determined bandwidth ratio is minimized.

The peak sidelobe ratio (PSLR) refers to the ratio of the highest sidelobe level to the mainlobe peak level.

In some embodiments, after the radar system transmits an actual waveform through a radar transmitter, the processing device may measure the peak sidelobe ratio of the actual waveform and select historical measured peak sidelobe ratios corresponding to the same coding model order to compute an average value as the new target peak sidelobe ratio, thereby enabling dynamic updating of the target peak sidelobe ratio to better align with the actual performance of the radar system.

The update coded waveform refers to the updated high freedom parameterized frequency-modulated coded waveform.

In some embodiments, the processing device may re-determine the parameterized instantaneous frequency function based on the updated parameter range, determine the phase of the signal based on the updated parameterized instantaneous frequency function, and generate the update coded waveform based on the phase of the signal. More details on generating the high freedom parameterized frequency-modulated coded waveform may be found in FIG. 1 and related descriptions.

In some embodiments, the processing device may refresh the display image of an interactive device to simultaneously display the high freedom parameterized frequency-modulated coded waveform and the update coded waveform. In some embodiments, the processing device may construct a first vector using the peak sidelobe ratio and the sidelobe width of the high freedom parameterized frequency-modulated coded waveform before updating, and construct a second vector using the peak sidelobe ratio and the sidelobe width of the update coded waveform. The similarity between the first vector and the second vector may be used as the waveform difference between the high freedom parameterized frequency-modulated coded waveform and the update coded waveform.

In some embodiments, in response to the waveform difference between the high freedom parameterized frequency-modulated coded waveform and the update coded waveform being greater than a predetermined difference threshold, the scanning range of the radar receiver of the radar system is adjusted based on the waveform difference. For example, by increasing the scanning range of the radar receiver, sufficient signal quality may still be maintained by expanding the signal acquisition range even when waveform quality is limited. Increasing the scanning range ensures that the radar's range resolution does not significantly degrade, thereby improving reliability and adaptability. Therefore, a greater waveform difference results in a larger scanning range. A person skilled in the art may preset the difference threshold based on specific requirements.

In some embodiments of the present disclosure, environmental factors (e.g., signal interference, noise, signal attenuation, etc.) may affect waveform quality. By dynamically adjusting the parameter range, the spectral distribution of the high freedom parameterized frequency-modulated coded waveform may be optimized. Additionally, the optimized spectral distribution of the high freedom parameterized frequency-modulated coded waveform may enhance signal matched filtering performance, reduce sidelobe energy, minimize interference with other signals, and improve the quality of coded waveform generation.

The following experimental data is provided to illustrate the performance of the high freedom parameterized frequency-modulated coded waveform proposed in the present disclosure (hereinafter referred to as the proposed coded waveform). During the experiment, signals with bandwidth and time width of 80 MHz and 10 μs, respectively, were used to generate the ideal phase-coded waveform, a PCFM waveform, and the proposed coded waveform. The simulation test and radar system measurements evaluated mismatch loss, signal spectrum, and autocorrelation function.

Figure 2A:
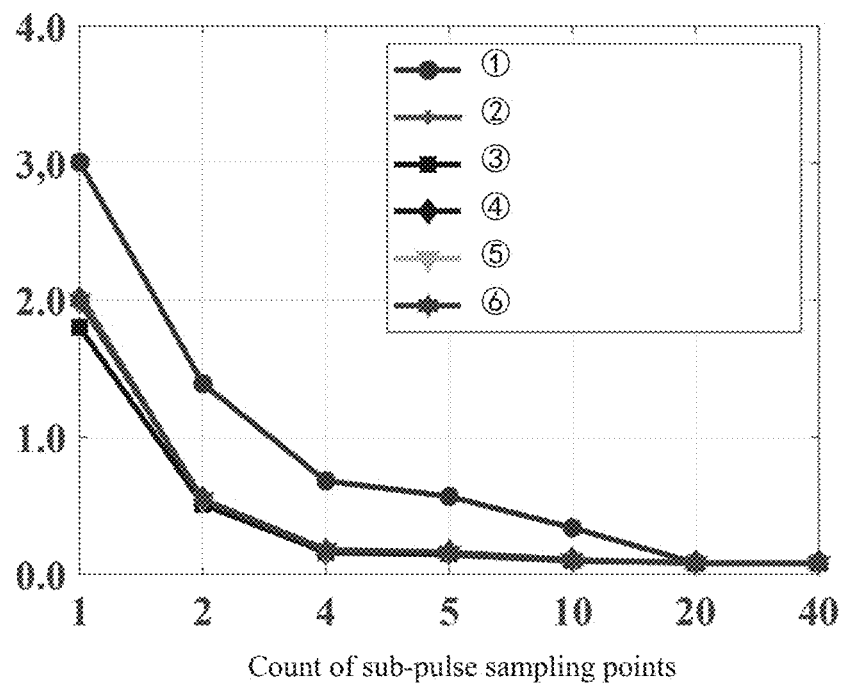
FIG. 2A is a schematic diagram illustrating an exemplary maximum mismatch loss of simulation data according to some embodiments of the present disclosure.
Figure 2B:
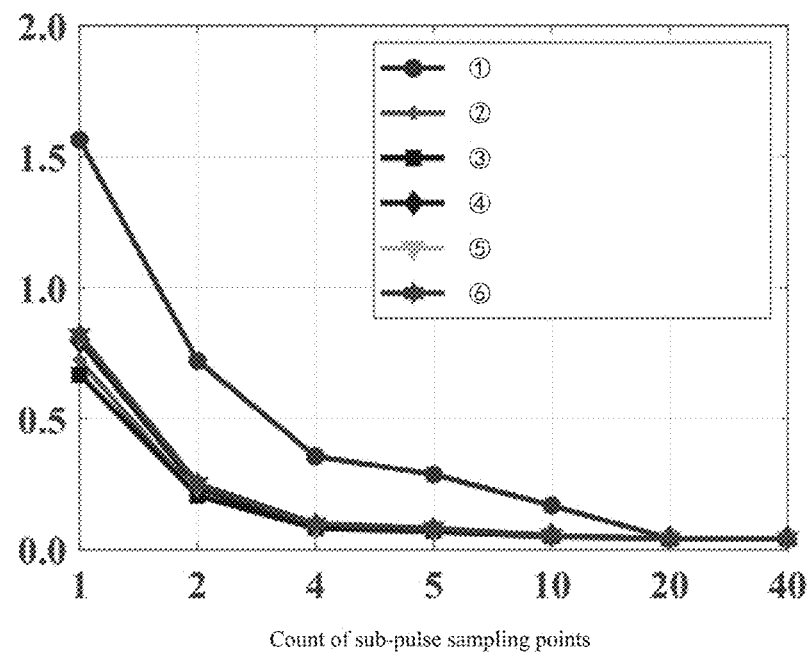
FIG. 2B is a schematic diagram illustrating an exemplary average mismatch loss of simulation data according to some embodiments of the present disclosure.
Figure 3A:
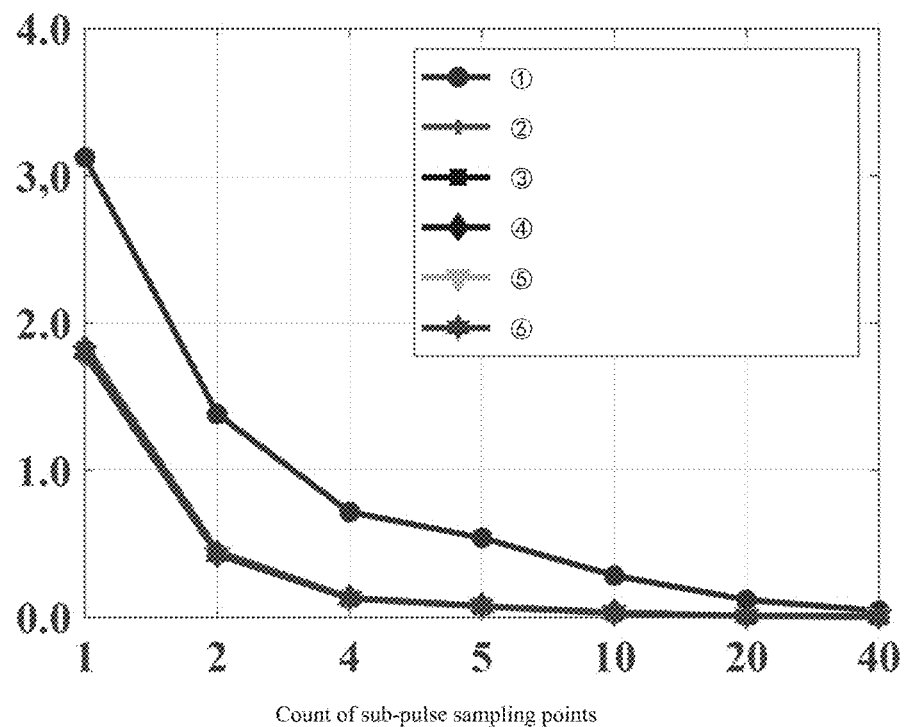
FIG. 3A is a schematic diagram illustrating an exemplary maximum mismatch loss of measured data according to some embodiments of the present disclosure.
Figure 3B:
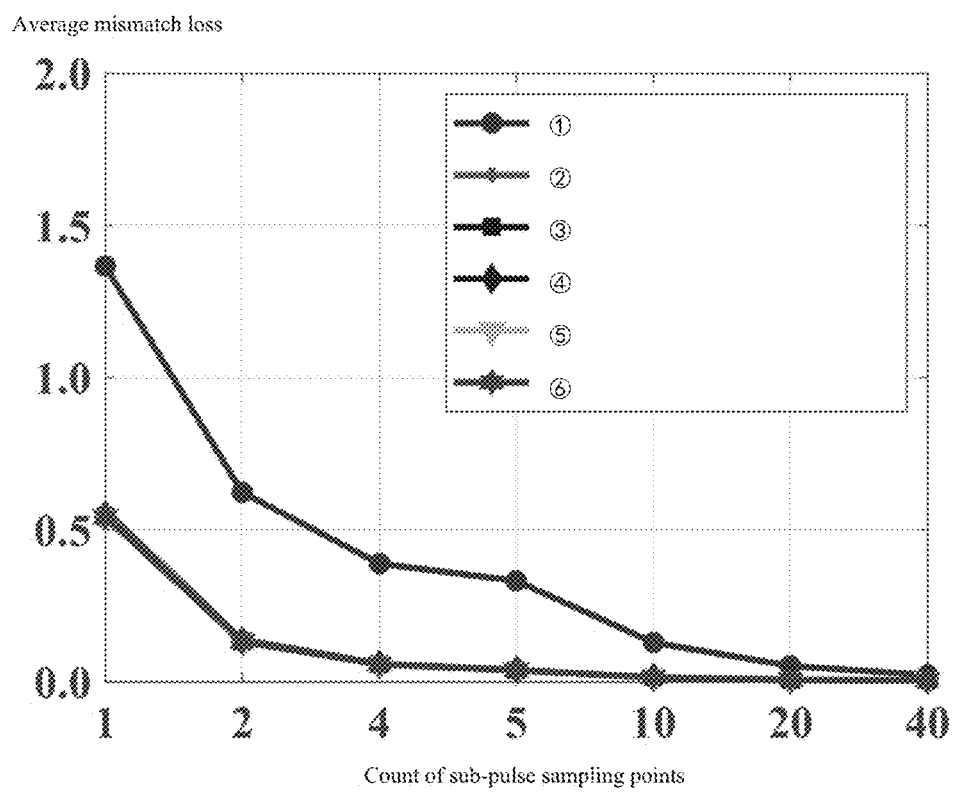
FIG. 3B is a schematic diagram illustrating an exemplary average mismatch loss of measured data according to some embodiments of the present disclosure.

FIG. 2A is an exemplary schematic diagram illustrating the maximum mismatch loss of simulation data according to some embodiments of the present disclosure. FIG. 2B is an exemplary schematic diagram illustrating the average mismatch loss of simulation data according to some embodiments of the present disclosure. FIG. 3A is an exemplary schematic diagram illustrating the maximum mismatch loss of measured data according to some embodiments of the present disclosure. FIG. 3B is an exemplary schematic diagram illustrating the average mismatch loss of measured data according to some embodiments of the present disclosure.

FIGS. 2A to 3B respectively illustrate the maximum mismatch loss and the average misalignment mismatch loss at different time delays before and after various waveforms enter an actual radar system, that is, the maximum and average mismatch loss values of different coded waveforms at different time delays. As shown in FIGS. 2A to 3B, for both simulation and measured results, as the number of sampling points per sub-pulse increases, the mismatch loss of all coded waveforms shows a decreasing trend, which is consistent with theoretical predictions. Additionally, as shown in FIGS. 2A to 3B, despite continuous changes in the number of sampling points, the mismatch loss of an ideal phase-coded waveform remains higher than that of a PCFM waveform and the proposed coded waveform. One reason for this phenomenon is that the phase jumps in the phase-coded waveform make it more sensitive to mismatch caused by time delay than the PCFM waveform and the proposed coded waveform.

Figure 4:
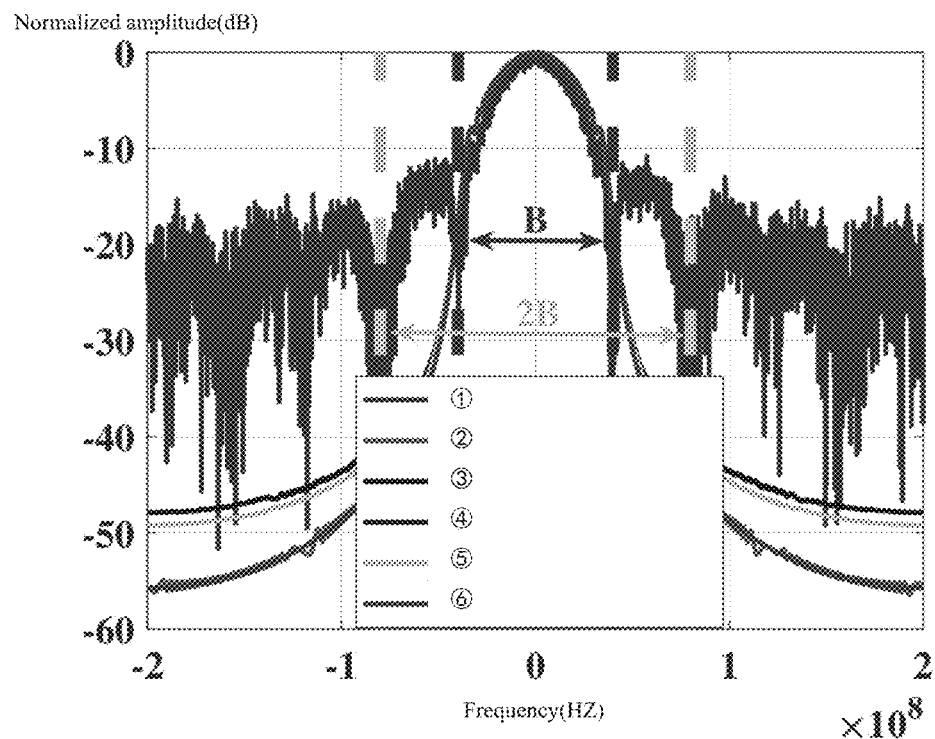
FIG. 4 is a schematic diagram illustrating an exemplary spectrum of an ideal phase-coded waveform, a PCFM waveform, a zero-order parameterized frequency-modulated waveform, a first-order parameterized frequency-modulated waveform, a second-order parameterized frequency-modulated waveform, and a hybrid-order parameterized frequency-modulated waveform generated through simulation according to some embodiments of the present disclosure.

FIG. 4 is an exemplary schematic diagram illustrating the spectrum of an ideal phase-coded waveform, a PCFM waveform, a zero-order parameterized frequency-modulated waveform, a first-order parameterized frequency-modulated waveform, a second-order parameterized frequency-modulated waveform, and a hybrid-order parameterized frequency-modulated waveform, all generated through simulation according to some embodiments of the present disclosure. A zero-order parameterized frequency-modulated waveform refers to a zero-order high freedom parameterized frequency-modulated coded waveform. A second-order parameterized frequency-modulated waveform refers to a second-order high freedom parameterized frequency-modulated coded waveform. A third-order parameterized frequency-modulated waveform refers to a third-order high freedom parameterized frequency-modulated coded waveform. A hybrid-order parameterized frequency-modulated waveform refers to a hybrid-order high freedom parameterized frequency-modulated coded waveform.

FIGS. 5A to 5F are exemplary schematic diagrams illustrating the spectra of various coded waveforms output by a measured radar system according to some embodiments of the present disclosure. FIGS. 5A to 5F respectively correspond to an ideal phase-coded waveform, a PCFM waveform, a zero-order parameterized frequency-modulated waveform, a first-order parameterized frequency-modulated waveform, a second-order parameterized frequency-modulated waveform, and a hybrid-order parameterized frequency-modulated waveform.

Figure 5A:
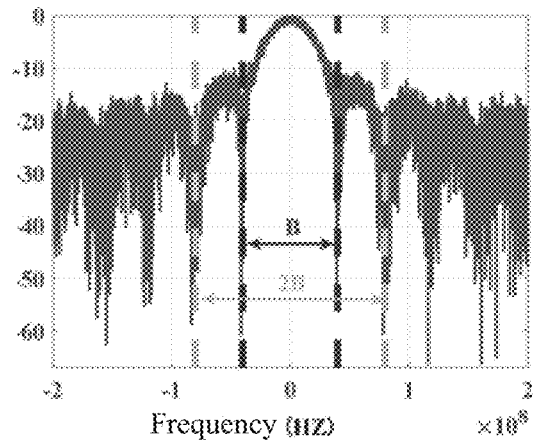
FIG. 5A is a schematic diagram illustrating an exemplary spectrum of an ideal phase-coded waveform output by a measured radar system according to some embodiments of the present disclosure.
Figure 5B:
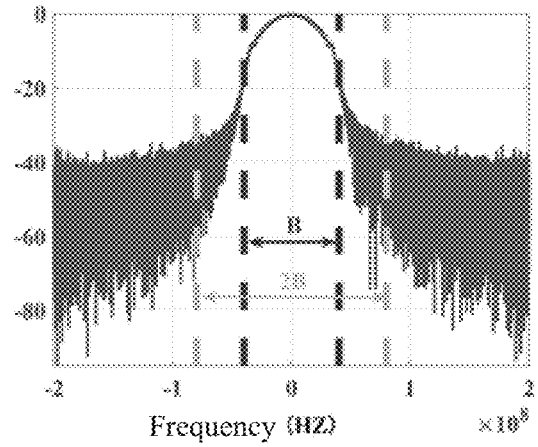
FIG. 5B is a schematic diagram illustrating an exemplary spectrum of a PCFM waveform according to some embodiments of the present disclosure.
Figure 5C:
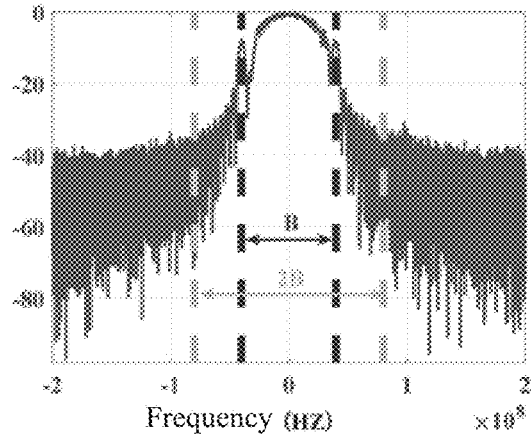
FIG. 5C is a schematic diagram illustrating an exemplary spectrum of a zero-order parameterized frequency-modulated waveform according to some embodiments of the present disclosure.
Figure 5D:
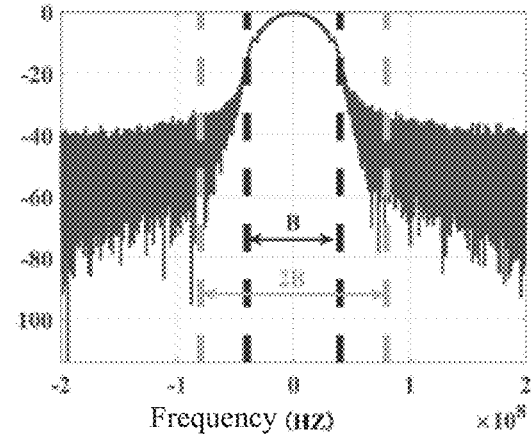
FIG. 5D is a schematic diagram illustrating an exemplary spectrum of a first-order parameterized frequency-modulated waveform according to some embodiments of the present disclosure.
Figure 5E:
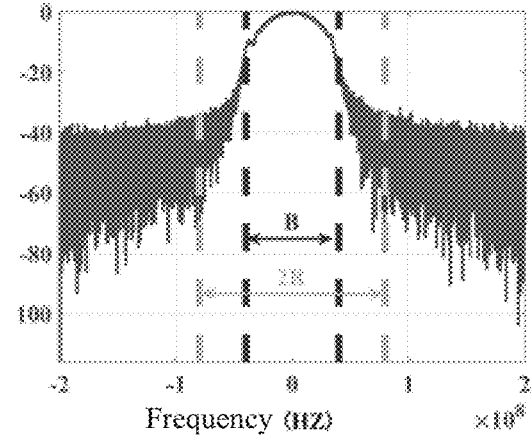
FIG. 5E is a schematic diagram illustrating an exemplary spectrum of a second-order parameterized frequency-modulated waveform according to some embodiments of the present disclosure.
Figure 5F:
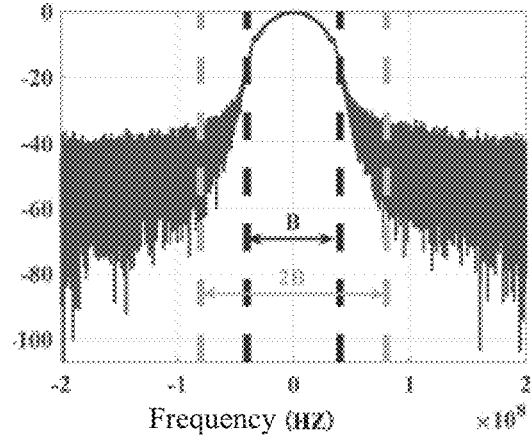
FIG. 5F is a schematic diagram illustrating an exemplary spectrum of a hybrid-order parameterized frequency-modulated waveform according to some embodiments of the present disclosure.
Figure 6A:
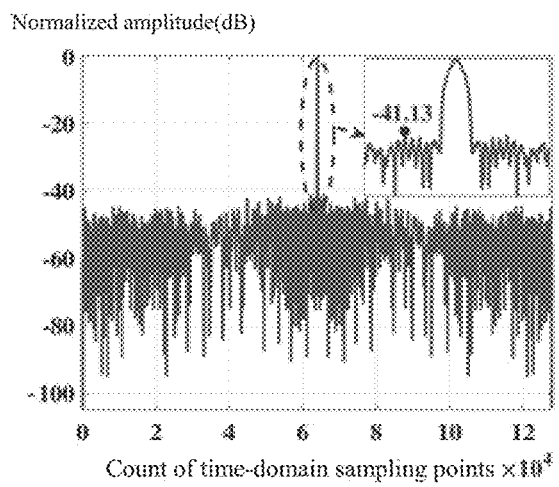
FIG. 6A is a schematic diagram illustrating an exemplary autocorrelation function of an ideally phase-coded waveform with 800 sub-pulses generated through simulation according to some embodiments of the present disclosure.
Figure 6B:
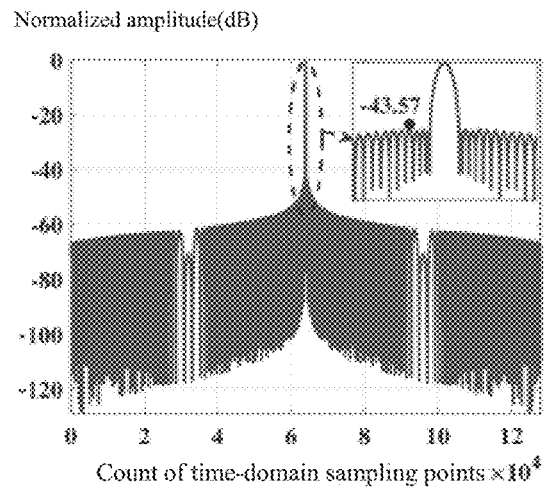
FIG. 6B is a schematic diagram illustrating an exemplary autocorrelation function of a PCFM waveform with 800 sub-pulses generated through simulation according to some embodiments of the present disclosure.
Figure 6C:
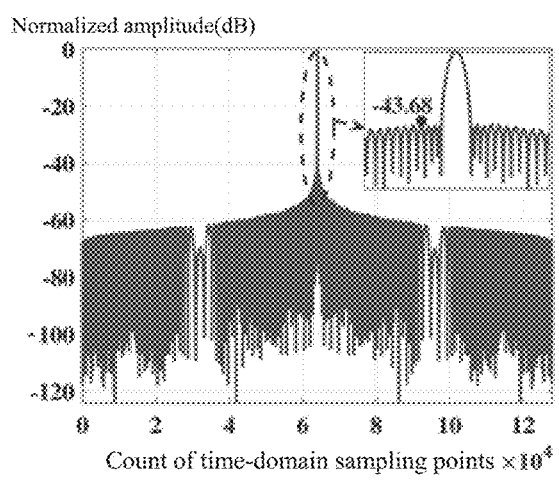
FIG. 6C is a schematic diagram illustrating an exemplary autocorrelation function of a zero-order parameterized frequency-modulated waveform with 800 sub-pulses generated through simulation according to some embodiments of the present disclosure.
Figure 6D:
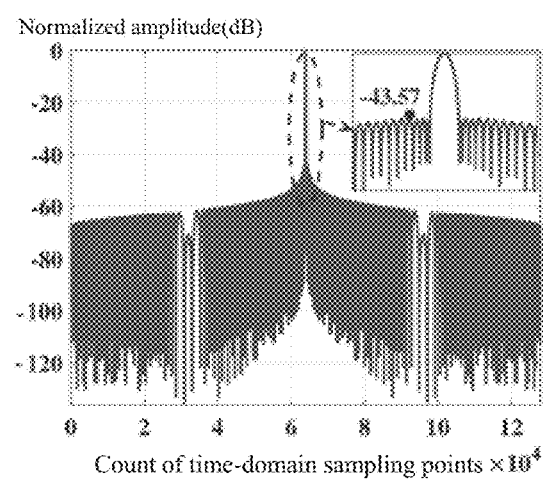
FIG. 6D is a schematic diagram illustrating an exemplary autocorrelation function of a first-order parameterized frequency-modulated waveform with 800 sub-pulses generated through simulation according to some embodiments of the present disclosure.
Figure 6E:
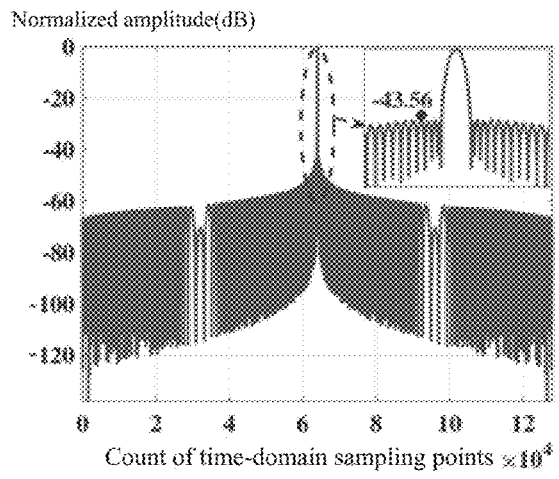
FIG. 6E is a schematic diagram illustrating an exemplary autocorrelation function of a second-order parameterized frequency-modulated waveform with 800 sub-pulses generated through simulation according to some embodiments of the present disclosure.
Figure 6F:
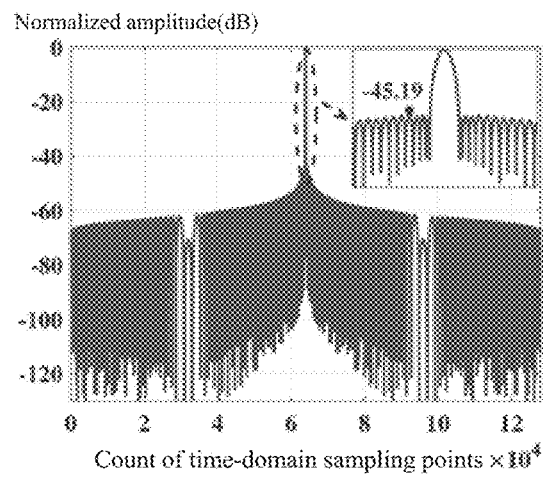
FIG. 6F is a schematic diagram illustrating an exemplary autocorrelation function of a hybrid-order parameterized frequency-modulated waveform with 800 sub-pulses generated through simulation according to some embodiments of the present disclosure.
Figure 7A:
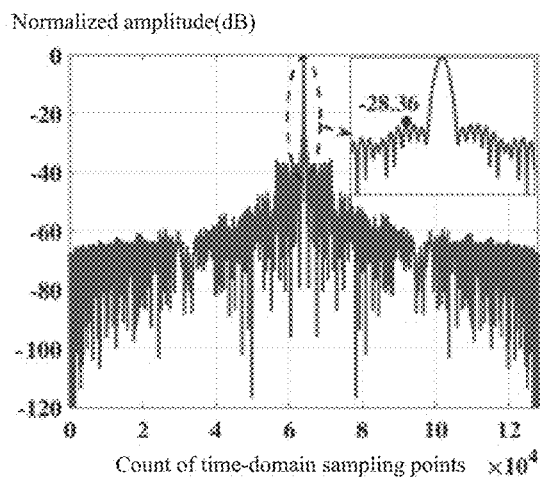
FIG. 7A is a schematic diagram illustrating an exemplary autocorrelation function of a zero-order parameterized frequency-modulated waveform with 49 sub-pulses generated through simulation according to some embodiments of the present disclosure.
Figure 7B:
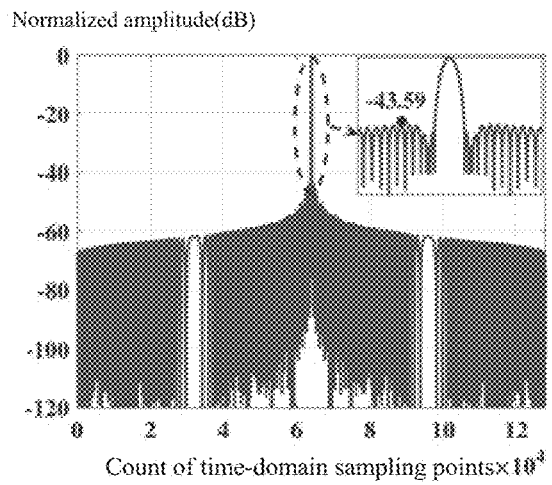
FIG. 7B is a schematic diagram illustrating an exemplary autocorrelation function of a first-order parameterized frequency-modulated waveform with 49 sub-pulses generated through simulation according to some embodiments of the present disclosure.
Figure 7C:
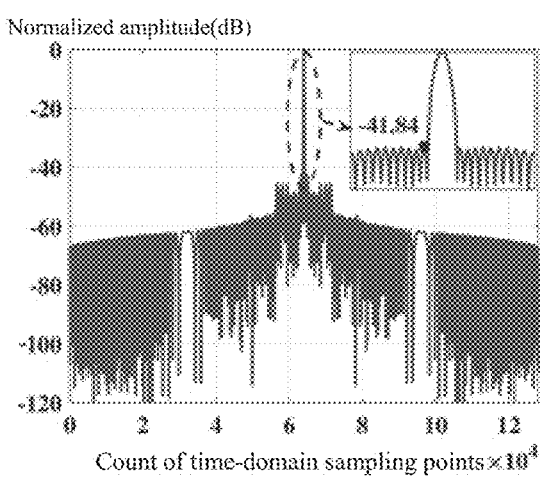
FIG. 7C is a schematic diagram illustrating an exemplary autocorrelation function of a second-order parameterized frequency-modulated waveform with 49 sub-pulses generated through simulation according to some embodiments of the present disclosure.
Figure 7D:
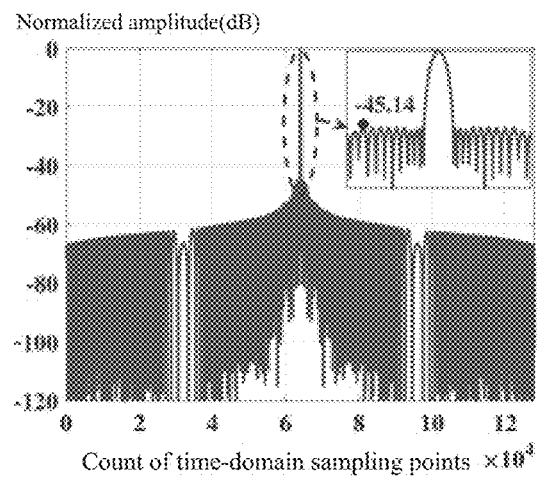
FIG. 7D is a schematic diagram illustrating an exemplary autocorrelation function of a hybrid-order parameterized frequency-modulated waveform with 49 sub-pulses generated through simulation according to some embodiments of the present disclosure.
Figure 8A:
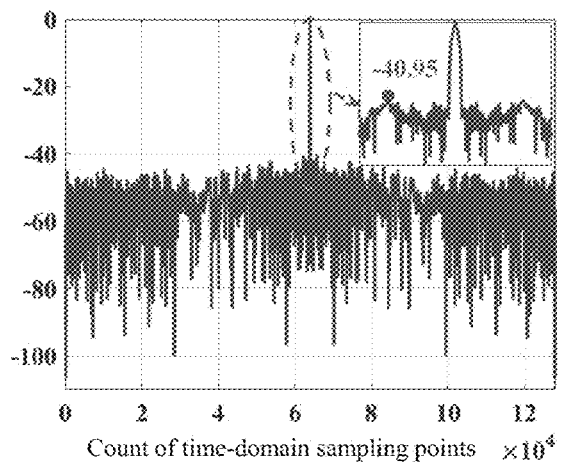
FIG. 8A is a schematic diagram illustrating an exemplary autocorrelation function of an ideal phase-coded waveform with 800 sub-pulses output by a measured radar system according to some embodiments of the present disclosure.
Figure 8B:
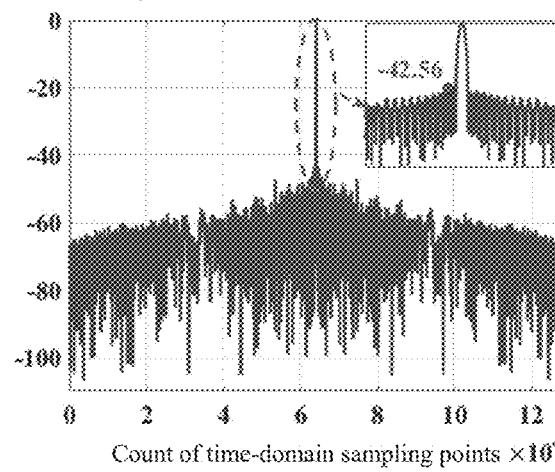
FIG. 8B is a schematic diagram illustrating an exemplary autocorrelation function of a PCFM waveform with 800 sub-pulses output by a measured radar system according to some embodiments of the present disclosure.
Figure 8C:
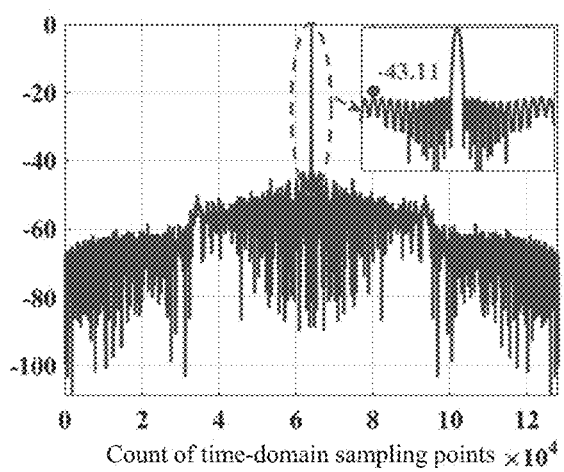
FIG. 8C is a schematic diagram illustrating an exemplary autocorrelation function of a zero-order parameterized frequency-modulated waveform with 800 sub-pulses output by a measured radar system according to some embodiments of the present disclosure.
Figure 8D:
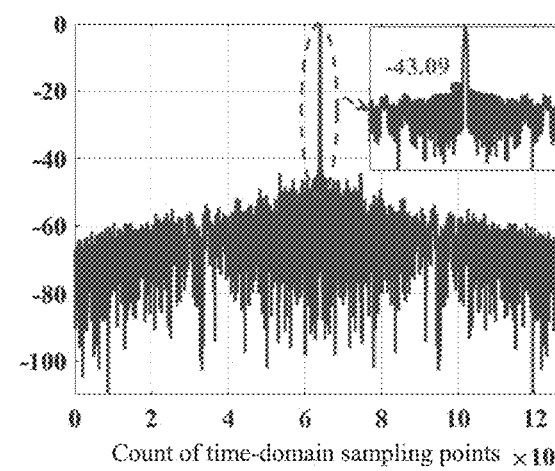
FIG. 8D is a schematic diagram illustrating an exemplary autocorrelation function of a first-order parameterized frequency-modulated waveform with 800 sub-pulses output by a measured radar system according to some embodiments of the present disclosure.
Figure 8E:
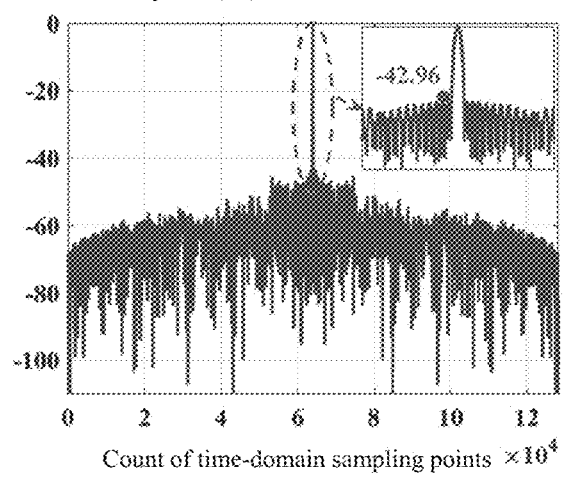
FIG. 8E is a schematic diagram illustrating an exemplary autocorrelation function of a second-order parameterized frequency-modulated waveform with 800 sub-pulses output by a measured radar system according to some embodiments of the present disclosure.
Figure 8F:
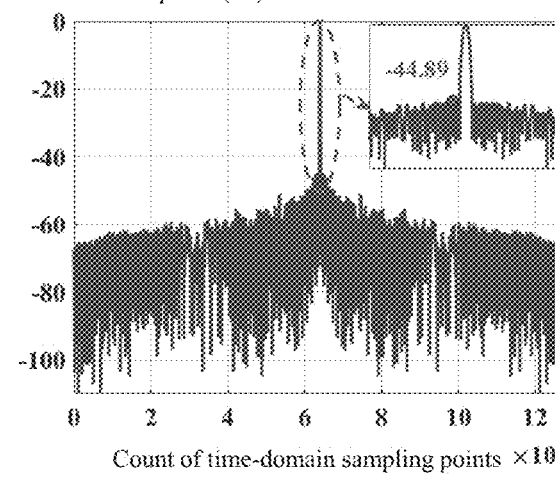
FIG. 8F is a schematic diagram illustrating an exemplary autocorrelation function of a hybrid-order parameterized frequency-modulated waveform with 800 sub-pulses output by a measured radar system according to some embodiments of the present disclosure.

FIGS. 4 to 5F respectively illustrate the simulated and measured signal spectra of various coded waveforms. Table 1 presents the energy proportion of various coded waveforms within the corresponding bandwidth. As shown in FIGS. 4 to 5F and Table 1, compared to the high spectral sidelobes of the ideal phase-coded waveform, the PCFM waveform and the proposed coded waveform exhibit similar spectral shapes, with their amplitudes sharply decreasing outside the bandwidth. Consequently, more energy is accumulated within the bandwidth. Additionally, the PCFM waveform requires an additional FTE criterion to constrain spectral content, which significantly increases the complexity of waveform design. In contrast, the proposed coded waveform directly encodes the frequency function, enabling more precise and efficient control of the signal spectrum.

TABLE 1

| Waveform Type | Proportion of energy (%) | | | |
| --- | --- | --- | --- | --- |
| | Simulation results | | Real results | |
| | B | 2B | B | 2B |
| ideal phase-coded waveform | 89.0 | 95.2 | 89.1 | 95.2 |
| PCFM waveform | 99.7 | 100 | 99.7 | 100 |
| Zero-order parameterized FM waveform | 99.3 | 100 | 98.3 | 100 |
| First-order parameterized FM waveform | 99.7 | 100 | 99.7 | 100 |
| Second-order parameterized FM waveforms | 99.5 | 100 | 99.5 | 100 |
| Mixed-order parameterized FM waveforms | 98.7 | 100 | 99.7 | 100 |

FIGS. 6A to 6F are exemplary schematic diagrams illustrating the autocorrelation functions of various coded waveforms, each with 800 sub-pulses, generated through simulation according to some embodiments of the present disclosure. FIGS. 6A to 6F respectively correspond to an ideal phase-coded waveform, a PCFM waveform, a zero-order parameterized frequency-modulated waveform, a first-order parameterized frequency-modulated waveform, a second-order parameterized frequency-modulated waveform, and a hybrid-order parameterized frequency-modulated waveform.

FIGS. 7A to 7D are exemplary schematic diagrams illustrating the autocorrelation functions of various coded waveforms, each with 49 sub-pulses, generated through simulation according to some embodiments of the present disclosure. FIGS. 7A to 7D respectively correspond to a zero-order parameterized frequency-modulated waveform, a first-order parameterized frequency-modulated waveform, a second-order parameterized frequency-modulated waveform, and a hybrid-order parameterized frequency-modulated waveform.

FIGS. 8A to 8F are exemplary schematic diagrams illustrating the autocorrelation functions of various coded waveforms, each with 800 sub-pulses, output by a measured radar system according to some embodiments of the present disclosure. FIGS. 8A to 8F respectively correspond to an ideal phase-coded waveform, a PCFM waveform, a zero-order parameterized frequency-modulated waveform, a first-order parameterized frequency-modulated waveform, a second-order parameterized frequency-modulated waveform, and a hybrid-order parameterized frequency-modulated waveform.

FIGS. 6A to 6F illustrate the autocorrelation functions and PSLR values of different coded waveforms, each with 800 sub-pulses, generated through simulation. As shown in FIGS. 6A to 6F, the PSLR values of the PCFM waveform and the zero-order, first-order, and second-order parameterized frequency-modulated waveforms are similar, all of which outperform the ideal phase-coded waveform. Additionally, the hybrid-order parameterized frequency-modulated waveform exhibits the lowest PSLR value among all coded waveforms.

FIGS. 7A to 7D illustrate the autocorrelation functions and PSLR values of the zero-order, first-order, second-order, and hybrid-order parameterized frequency-modulated waveforms, each with 49 sub-pulses, generated through simulation. Although the PSLR performance of some parameterized frequency-modulated waveforms decreases at certain orders, the hybrid-order parameterized frequency-modulated waveform consistently achieves the lowest PSLR value. This result confirms that the proposed coded waveform may provide excellent autocorrelation sidelobe performance even when using significantly fewer sub-pulses than the time-bandwidth product, greatly reducing design complexity and making it more favorable for practical applications.

FIGS. 8A to 8F illustrate the autocorrelation functions and PSLR values of coded waveforms, each with 800 sub-pulses, after processing through an actual radar system. Although system errors may degrade PSLR performance, the PSLR value of the proposed coded waveform consistently remains superior to that of the ideal phase-coded waveform and the PCFM waveform.

In some embodiments, the method for the high freedom parameterized frequency-modulated coded waveform is executed by a processing device of a radar system, the number of sub-pulses M is equal to a target sub-pulse count, the target sub-pulse count is determined based on the bandwidth, the pulse width, the time-bandwidth product and the coding model order, and the method for the high freedom parameterized frequency-modulated coded waveform further comprises: generating the high freedom parameterized frequency-modulated coded waveform based on the target sub-pulse count; generating a radar emission parameter based on the high freedom parameterized frequency-modulated coded waveform; and controlling a radar transmitter of the radar system to transmit an electromagnetic wave signal based on the radar emission parameter.

Figure 9:
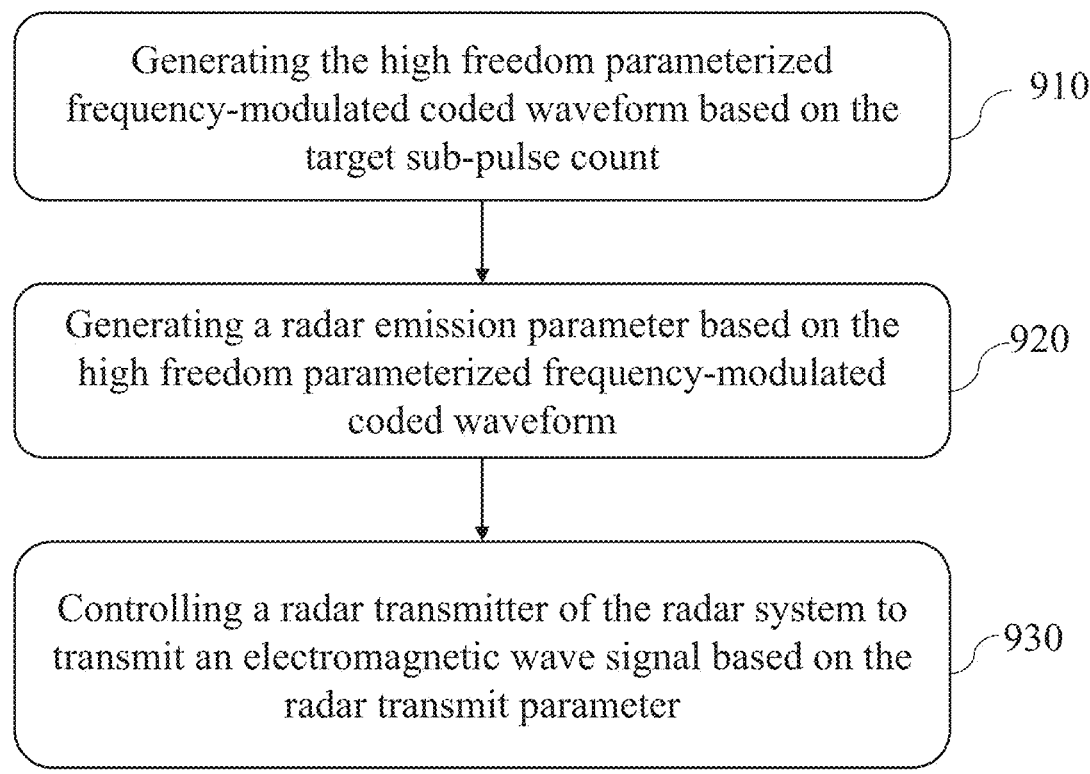
FIG. 9 is a flowchart of an exemplary process for transmitting an electromagnetic wave signal according to some embodiments of the present disclosure.

FIG. 9 is a flowchart of an exemplary process for transmitting an electromagnetic wave signal according to some embodiments of the present disclosure. As shown in FIG. 9, the process 900 includes the following operations. In some embodiments, the process 900 may be executed by a processing device in a radar system. In some embodiments, process 900 may be performed by a processing device in a radar system.

In 910, the high freedom parameterized frequency-modulated coded waveform is generated based on the target sub-pulse count.

In some embodiments, the processing device may determine the target sub-pulse count in various ways. For example, the processing device may construct candidate vectors based on the bandwidth, the pulse width, the time-bandwidth product, and the coding model order of each historical waveform stored in a storage device of the radar system and determine a plurality of historical sub-pulse counts and historical peak sidelobe ratios corresponding to the candidate vectors. The processing device may construct a reference vector using the bandwidth, the pulse width, the time-bandwidth product, and the coding model order of the parameterized frequency-modulated waveform, determine a similarity between each candidate vector and the reference vector, and select candidate vectors having a similarity with the reference vector that exceeds a preset threshold. The processing device may then determine the historical peak sidelobe ratios corresponding to the selected candidate vectors, select the historical peak sidelobe ratio that is closest to a target peak sidelobe ratio from the historical peak sidelobe ratios, and use the historical sub-pulse count corresponding to the selected historical peak sidelobe ratio as the target sub-pulse count. It should be noted that if the historical peak sidelobe ratios closest to the target peak sidelobe ratio include one that is greater than the target peak sidelobe ratio and one that is smaller than the target peak sidelobe ratio, the processing device selects the smaller historical peak sidelobe ratio.

The similarity may be represented by cosine similarity, vector distance, or the like. The target peak sidelobe ratio may be determined based on a reference table. More descriptions regarding the determination of the target peak sidelobe ratio may be found in FIG. 1 and related descriptions thereof.

Figure 10:
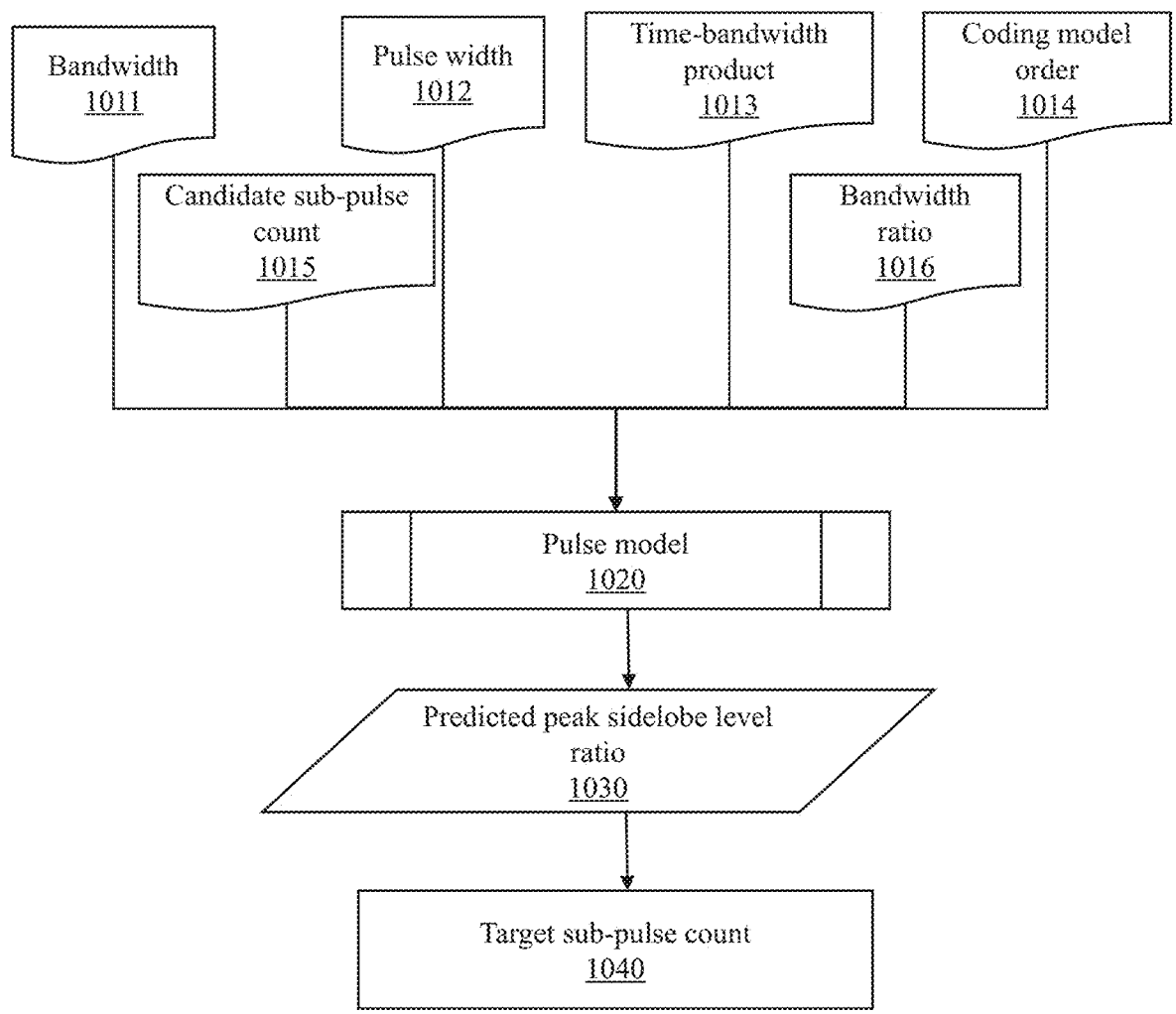
FIG. 10 is a schematic diagram illustrating an exemplary pulse model according to some embodiments of the present disclosure.

FIG. 10 is a schematic diagram illustrating an exemplary pulse model according to some embodiments of the present disclosure.

In some embodiments, as shown in FIG. 10, the processing device may generate predicted peak sidelobe ratios 1030 corresponding to candidate sub-pulse counts using a pulse model 1020 based on the bandwidth 1011, the pulse width 1012, the time-bandwidth product 1013, the coding model order 1014, the candidate sub-pulse counts 1015, and the bandwidth ratio 1016 of the parameterized frequency-modulated waveform. The processing device may then determine a target sub-pulse count 1040 based on the predicted peak sidelobe ratios 1030.

In some embodiments, the pulse model may be a machine learning model. For example, the pulse model may be Neural Network (NN), etc.

In some embodiments, as shown in FIG. 10, for each candidate sub-pulse count 1015, input to the pulse model 1020 may include the bandwidth 1011, the pulse width 1012, the time-bandwidth product 1013, the coding model order 1014, the candidate sub-pulse count 1015, and the bandwidth ratio 1016. The output of the pulse model 1020 may be a predicted peak sidelobe ratio 1030 corresponding to the candidate sub-pulse count.

In some embodiments, a technician may randomly generate the candidate sub-pulse counts using a waveform generator, where the candidate sub-pulse counts shall not be lower than a minimum allowable value. The minimum allowable value may be preset based on prior knowledge, for example, it may be the minimum historical sub-pulse count corresponding to historical waveforms that meet system performance requirements.

In some embodiments, the processing device may obtain a plurality of labeled training samples to form a training sample set and perform a plurality of iterations based on the training sample set to generate the pulse model 1020. Each training sample includes a sample bandwidth, a sample pulse width, a sample time-bandwidth product, a sample coding model order, a sample sub-pulse count, and a sample bandwidth ratio of a sample parameterized frequency-modulated waveform. The label corresponding to each training sample is a sample predicted peak sidelobe ratio.

In some embodiments, the processing device may use historical waveform data, including a historical bandwidth, a historical pulse width, a historical time-bandwidth product, a historical coding model order, a historical sub-pulse count, and a historical bandwidth ratio, as training samples and use historical peak sidelobe ratios as labels corresponding to the training samples.

In some embodiments, the processing device may determine a similarity between each candidate vector and the reference vector, select a plurality of candidate vectors with similarities within a preset range, and use the average values of the historical bandwidth, historical pulse width, the historical time-bandwidth product, the historical coding model order, the historical sub-pulse count, and the historical bandwidth ratio of the historical waveforms corresponding to the selected candidate vectors as a training sample. The average value of the corresponding historical peak sidelobe ratios is used as the label corresponding to the training sample. The preset range may be predetermined based on prior knowledge, for example, the preset range may be 95%-100%. More descriptions regarding determining the similarity between the candidate vector and the reference vector may be found in the related descriptions above.

In some embodiments, each iteration includes: selecting one or more training samples from the training sample set, inputting the one or more training samples into an initial pulse model to obtain model prediction outputs corresponding to the one or more training samples; substituting the model prediction output corresponding to the one or more training samples and the labels corresponding to the one or more training samples into a predefined loss function to calculate the value of the loss function; iteratively updating the model parameters of the initial pulse model based on the value of the loss function until an iteration termination condition is met, thereby completing the training and obtaining the trained pulse model. The iterative update of the model parameters of the initial pulse model may be performed using various methods, such as a gradient descent algorithm.

In some embodiments, the processing device may divide the plurality of training samples into the plurality of training datasets based on the sample sub-pulse counts of the plurality of training samples; for each training dataset in the plurality of training datasets, determine the learning rate for the training dataset based on the labels of the training samples in the training dataset; and alternately train the pulse model based on the plurality of training datasets and their corresponding learning rates.

In some embodiments, the processing device may divide the plurality of training samples into the plurality of training datasets based on the magnitude of the sample sub-pulse counts. For example, the processing device may assign the training samples with the sample sub-pulse counts of less than 100 to training dataset 1, assign training samples with the sample sub-pulse counts greater than or equal to 100 and less than 200 to training dataset 2, and assign the training samples with the sample sub-pulse counts greater than or equal to 200 and less than 300 to training dataset 3.

In some embodiments, the processing device may dynamically adjust the learning rate of training based on the variance of the labels in the training dataset. For example, a higher variance in the labels of a training dataset indicates that the training dataset may have lower representativeness and higher training difficulty. Therefore, if the label variance of the training dataset is high, the processing device may reduce the model's learning rate; if the label variance is low, the processing device may increase the model's learning rate.

Alternating training refers to performing different iterations of training based on different training datasets and corresponding learning rates. That is, the training dataset and the learning rate used in each iteration are different. For example, if the learning rates corresponding to training dataset 1, training dataset 2, and training dataset 3 are L1, L2, and L3, respectively, the first iteration of training may be performed based on training dataset 1 and learning rate L1, the second iteration of training may be performed based on training dataset 2 and learning rate L2, the third iteration of training may be performed based on training dataset 3 and learning rate L3, and the fourth iteration of training may return to training dataset 1 and learning rate L1, and so on, until the training condition (e.g., model convergence) is met. It should be understood that the training dataset used in different iterations may be randomly selected or determined according to a specific rule.

In some embodiments of the present disclosure, by alternately training the pulse model using different training datasets and different learning rates, the pulse model may adapt to the data distribution of the plurality of training datasets, preventing oscillation or unstable convergence when trained on a single training dataset. By dynamically adjusting the learning rate, the robustness of waveform optimization module training may be improved.

In some embodiments, the processing device may determine a plurality of reference sub-pulse counts corresponding to a plurality of predicted peak sidelobe ratios that are smaller than a target peak sidelobe ratio based on the plurality of candidate sub-pulse counts corresponding to the predicted peak sidelobe ratios. The processing device may then select the reference sub-pulse count with the smallest peak sidelobe ratio from the plurality of reference sub-pulse counts as the target sub-pulse count.

In some embodiments of the present disclosure, by using the trained pulse model, the peak sidelobe ratios of the candidate sub-pulses may be predicted, thereby accelerating the generation process of the frequency-modulated coded waveform, reducing computational resource consumption, and significantly improving the efficiency of the radar system in waveform generation and optimization.

In some embodiments, the processing device may generate the target sub-pulse count based on an optimal coding model order. More descriptions regarding the optimal coding model order may be found in FIG. 11 and related descriptions thereof.

In some embodiments, the processing device may determine the target sub-pulse count as the count of sub-pulses M in operation 110, and then generate the high freedom parameterized frequency-modulated coded waveform through process 100. More descriptions regarding generating the high freedom parameterized frequency-modulated coded waveform may be found in FIG. 1 and related descriptions thereof.

In 920, the radar emission parameter is generated based on the high freedom parameterized frequency-modulated coded waveform.

The radar emission parameter refers to parameters related to the transmission of electromagnetic wave signals by the radar transmitter. For example, the radar emission parameter includes transmission power, pulse signal duration, transmission frequency, or the like.

In some embodiments, the processing device may generate the radar emission parameter corresponding to the high freedom parameterized frequency-modulated coded waveform based on a preset table and parameters related to the high freedom parameterized frequency-modulated coded waveform (e.g., coding parameters). The preset table may be predetermined by a technician.

In 930, the radar transmitter of the radar system is controlled to transmit the electromagnetic wave signal based on the radar emission parameter.

In some embodiments, the processing device may control the radar transmitter of the radar system to transmit an electromagnetic wave signal based on the radar emission parameter, thereby increasing the range resolution and anti-jamming capability of the radar system, as well as adjusting or updating the radar display results regarding the distance, size, and flight speed of a target object. For example, the processing device may generate a digital waveform signal based on the radar emission parameter and control the radar transmitter to transmit the electromagnetic wave signal according to the digital waveform signal.

In some embodiments of the present disclosure, by determining a reasonable target sub-pulse count, the computational burden and waveform design complexity can be reduced, unnecessary data processing can be avoided, and the performance of the peak sidelobe ratio can be ensured. As a result, the waveform generation speed is accelerated, and processing efficiency is improved.

It should be noted that the above description of process 900 is merely for illustration and explanation and does not limit the scope of the present disclosure. Various modifications and changes to the process may be made by those skilled in the art based on the teachings of the present disclosure. However, these modifications and changes still fall within the scope of the present disclosure.

Figure 11:
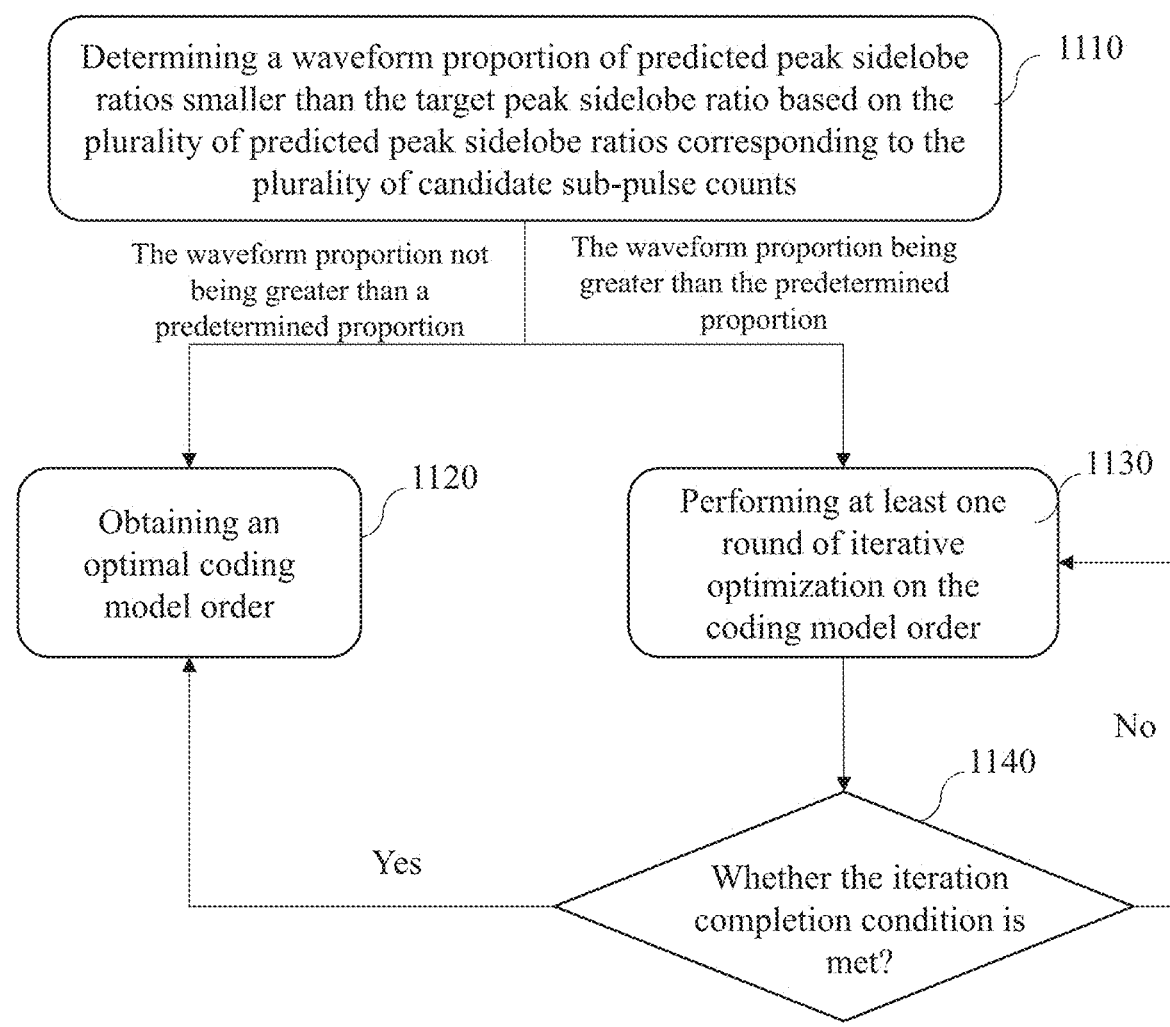
FIG. 11 is a flowchart illustrating an exemplary process for determining an optimal coding model order according to some embodiments of the present disclosure.

FIG. 11 is a flowchart illustrating an exemplary process for determining an optimal coding model order according to some embodiments of the present disclosure. As shown in FIG. 11, the process 1100 includes the following operations. In some embodiments, the process 1100 may be executed by a processing device in a radar system.

In some embodiments, the processing device may determine, based on a plurality of predicted peak sidelobe ratios corresponding to a plurality of candidate sub-pulse counts, a waveform proportion of predicted peak sidelobe ratios smaller than a target peak sidelobe ratio among the plurality of predicted peak sidelobe ratios; and in response to determining that the waveform proportion is greater than a predetermined proportion, perform at least one round of iterative optimization on the coding model order until the iteration completion condition is met, and obtain an optimal coding model order, the iteration completion condition including that the waveform proportion not being greater than the predetermined proportion.

In 1110, based on the plurality of predicted peak sidelobe ratios corresponding to the plurality of candidate sub-pulse counts, the waveform proportion of predicted peak sidelobe ratios smaller than the target peak sidelobe ratio is determined.

In some embodiments, the processing device may compare the plurality of predicted peak sidelobe ratios corresponding to the plurality of candidate sub-pulse counts with the target peak sidelobe ratio, and determine a count of predicted peak sidelobe ratios that are smaller than the target peak sidelobe ratio. The processing device may determine a ratio of the count of predicted peak sidelobe ratios that are smaller than the target peak sidelobe ratio to a total count of the predicted peak sidelobe ratios as the waveform proportion. More descriptions regarding the target peak sidelobe ratio may be found in FIG. 1 and related descriptions thereof.

In some embodiments, in response to determining that the waveform proportion is not greater than a predetermined proportion, the waveform generator may perform operation 1120. In some embodiments, in response to determining that the waveform proportion is greater than the predetermined proportion, the waveform generator may perform operations 1130-1140. The predetermined proportion may be preset based on prior knowledge.

In 1120, in response to determining that the waveform proportion is not greater than the predetermined proportion, the optimal coding model order is obtained.

In some embodiments, in response to determining that the waveform proportion is not greater than the predetermined proportion, the processing device may maintain the current coding model order without adjustment and determine the current coding model order as the optimal coding model order.

In 1130, in response to determining that the waveform proportion is greater than the predetermined proportion, at least one round of iterative optimization is performed on the coding model order until the iteration completion condition is met, and the optimal coding model order is obtained.

The at least one round of iteration includes adjusting the current coding model order by the processing device. For example, the processing device may reduce a hybrid-order coding model to a second-order coding model, reduce the second-order coding model to a first-order coding model, or reduce the first-order coding model to a zero-order coding model, and so on. If the current coding model order is a zero-order coding model, no reduction is required.

In 1140, whether the iteration completion condition is met is determined.

The iteration completion condition may include the waveform proportion being not greater than the predetermined proportion.

In some embodiments, in response to determining that the iteration completion condition is not met, the waveform generator may continue performing operations 1130-1140. In some embodiments, in response to determining that the iteration completion condition is met, the waveform generator may perform operation 1120.

In some embodiments of the present disclosure, by adjusting the coding model order type, unnecessary computational resource consumption caused by excessively high-order models can be avoided, ensuring waveform quality while achieving optimal performance with minimal computation. As a result, the final generated frequency-modulated coded waveform meets the target peak sidelobe ratio requirements, improves signal clarity, and enhances the radar's detection accuracy and anti-interference capability.

The fundamental concepts have been described above. It is evident that the detailed disclosure provided is merely for illustration and does not constitute a limitation of the present disclosure. Although not explicitly stated, those skilled in the art may make various modifications, improvements, and refinements to the present disclosure. Such modifications, improvements, and refinements are contemplated within the present disclosure, and they still fall within the spirit and scope of the exemplary embodiments of the present disclosure.

Additionally, specific terms have been used in the present disclosure to describe embodiments of the present disclosure. Terms such as "one embodiment," "an embodiment," and/or "some embodiments" refer to a feature, structure, or characteristic that is related to at least one embodiment of the present disclosure. Therefore, it should be emphasized and noted that a plurality of mentions of "an embodiment" or "one embodiment" or "an alternative embodiment" in different sections of the present disclosure do not necessarily refer to the same embodiment. Furthermore, certain features, structures, or characteristics from one or more embodiments of the present disclosure may be appropriately combined. Moreover, unless explicitly stated in the claims, the sequence of processing elements and steps described in the present disclosure, the use of numerical or alphabetical labels, or other naming conventions are not intended to limit the order of processes and methods in the present disclosure.

Although various examples have been discussed in the above disclosure regarding presently considered useful implementations of the invention, it should be understood that such details are for illustration purposes only. The appended claims are not limited to the disclosed embodiments but rather intend to cover all modifications and equivalent combinations that fall within the substance and scope of the embodiments of the present disclosure. For example, while the described system components may be implemented through hardware devices, they may also be implemented purely as software solutions, such as by installing the described system on existing servers or mobile devices.

Similarly, it should be noted that, to simplify the presentation of the disclosure of the present disclosure and facilitate the understanding of one or more embodiments of the invention, a plurality of features are sometimes merged into a single embodiment, figure, or description thereof in the foregoing description of the embodiments of the present disclosure. However, this method of disclosure does not imply that the subject matter of the present disclosure requires more features than those explicitly stated in the claims. In practice, the features of an embodiment may be fewer than the complete set of features disclosed in a single embodiment described above.

In some embodiments, numerical values describing components or attribute quantities are used. It should be understood that such numerical values used in the description of embodiments may, in some examples, be modified by terms such as "about" "approximately" or "substantially". Unless otherwise stated, "about". "approximately" or "substantially" indicate that the numerical values allow for a variation of ±20%. Accordingly, in some embodiments, the numerical parameters used in the present disclosure and the claims are approximate values, which may be adjusted based on the characteristics required for individual embodiments. In some embodiments, numerical parameters should consider the specified significant figures and be rounded using conventional rounding methods. Although the numerical ranges and parameters used in some embodiments of the present disclosure are approximate values to confirm their broad scope, such numerical values are set as precisely as possible within feasible limits in specific embodiments.

Each patent, patent application, published patent application, and other materials such as articles, books, manuals, publications, and documents referenced in the present disclosure is hereby incorporated in its entirety by reference. Except for application history documents that are inconsistent with or conflict with the contents of the present disclosure, and except for documents that impose limitations on the broadest scope of the claims of the present disclosure (whether currently or subsequently added to the present disclosure). It should be noted that if there are inconsistencies or conflicts between the descriptions, definitions, and/or terminology used in the attached materials of the present disclosure and the contents of the present disclosure, the descriptions, definitions, and/or terminology used in the present disclosure shall prevail.

Finally, it should be understood that the embodiments described in the present disclosure are merely intended to illustrate the principles of the embodiments of the present disclosure. Other modifications may also fall within the scope of the present disclosure. Therefore, by way of example and not limitation, alternative configurations of the embodiments of the present disclosure may be considered consistent with the teachings of the present disclosure. Accordingly, the embodiments of the present disclosure are not limited to only those explicitly described and illustrated in the present disclosure.

What is claimed is:

1. A method for designing a high freedom parameterized frequency-modulated coded waveform, comprising:
   step S1: obtaining a frequency-modulated coded vector;
   step S2: selecting a coding model order to be utilized;
   step S3: obtaining an instantaneous frequency function of a signal based on the frequency-modulated coded vector and the coding model order, integrating the instantaneous frequency function of the signal to obtain a phase of the signal and generate the high freedom parameterized frequency-modulated coded waveform;
   step S4: generating a radar emission parameter based on the high freedom parameterized frequency-modulated coded waveform;
   step S5: controlling a radar transmitter of a radar system to transmit an electromagnetic wave signal based on the radar emission parameter; wherein
   the step S1 includes: obtaining a parameterized frequency-modulated waveform having a constant amplitude and M sub-pulses, a bandwidth and a pulse width of the parameterized frequency-modulated waveform being B and T, respectively; determining a power spectrum of the parameterized frequency-modulated waveform by selecting a target window function; generating a set of waveforms based on a principle of stationary phase; sampling an instantaneous frequency function of the set of waveforms to acquire the frequency-modulated coded vector $\zeta=[\zeta_0, \zeta_1, \ldots, \zeta_M]$; determining a start frequency point and a termination frequency point of each of the set of sub-pulses in the parameterized frequency-modulated waveform based on the frequency-modulated coded vector, a value of M being in a range from 1 to a time-bandwidth product, the coding model order is an order of a strike curve of each sub-pulse frequency in the high freedom parameterized frequency-modulated coded waveform,
   in response to selecting a zero-order coding model, each sub-pulse frequency in the high freedom parameterized frequency-modulated coded waveform is a constant value,
   in response to selecting a first-order coding model, each sub-pulse frequency in the high freedom parameterized frequency-modulated coded waveform has a linear relationship with time,
   in response to selecting a second-order coding model, each sub-pulse frequency in the high freedom parameterized frequency-modulated coded waveform has a quadratic relationship with the time,
   in response to selecting a hybrid-order coding model, each sub-pulse frequency in the high freedom parameterized frequency-modulated coded waveform is constant value, or has a linear relationship with the time, or has a quadratic relationship with the time;
   wherein the count M of the sub-pulses is equal to a target sub-pulse count, and before the step S1, the method further comprises:
   generating predicted peak sidelobe ratios corresponding to candidate sub-pulse counts using a pulse model based on the bandwidth, the pulse width, the time-bandwidth product, the coding model order, the candidate sub-pulse counts, and a bandwidth ratio, the pulse model being a machine learning model; and
   determining the target sub-pulse count based on the predicted peak sidelobe ratios.

2. The method of claim 1, wherein
   the step S3 includes: outputting a coding parameter base on the start frequency point and the termination frequency point of each sub-pulse in the parameterized frequency-modulated waveform of the step S1 and the order of the strike curve of each sub-pulse frequency in the high freedom parameterized frequency-modulated coded waveform; and acquiring the instantaneous frequency function of the signal base on the coding parameter,
   in response to selecting the zero-order coding model, the instantaneous frequency function of a zero-order high freedom parameterized frequency-modulated coded waveform is expressed as:

$$f_0(t';\zeta) = \sum_{m=1}^{M} c_m rect\left(\frac{t' - (m-1)T_p - T_p/2}{T_p}\right),$$

wherein the coding parameter $c_m=\zeta_m$ denotes a frequency value of a $m^{th}$ sub-pulse, $T_p=T/M$ denotes the pulse width of the sub-pulse, and t' denotes the time, in response to selecting the first-order coding model, the instantaneous frequency function of a first-order high freedom parameterized frequency-modulated coded waveform is expressed as:

$$f_1(t';\zeta) = \int_0^{t'} \sum_{m=1}^{M} b_m rect\left(\frac{t'' - (m-1)T_p - T_p/2}{T_p}\right)dt'' + \zeta_0,$$

wherein the coding parameter $b_m=(\zeta_m-\zeta_{m-1})/T_p$ denotes a chirp rate of the $m^{th}$ sub-pulse, and t" denotes a variable;

in response to selecting the second-order coding model, the instantaneous frequency function of a second-order high freedom parameterized frequency-modulated coded waveform is expressed as:

$$f_2(t';\zeta) = \int_0^{t'} \int_0^{t''} \sum_{m=1}^{M} a_m rect\left(\frac{t''' - (m-1)T_p - T_p/2}{T_p}\right) dt''' dt'' + \zeta_0,$$

wherein the coding parameter $a_m = 2\ (\zeta_m - \zeta_{m-1})/T_p^2$ denotes a frequency modulation acceleration rate of the $m^{th}$ sub-pulse;

in response to selecting the hybrid-order coding model, the instantaneous frequency function of a hybrid-order high freedom parameterized frequency-modulated coded waveform is expressed as:

$$f_3(t';\zeta) = \int_0^{t'} \int_0^{t''} \sum_{m=1}^{M} a_m' rect\left(\frac{t''' - (m-1)T_p - T_p/2}{T_p}\right) dt''' +$$

$$\int_0^{t'} \sum_{m=1}^{M} b_m' rect\left(\frac{t'' - (m-1)T_p - T_p/2}{T_p}\right) dt'' + \sum_{m=1}^{[t'/T_p]} c_m' + \zeta_0,$$

wherein $a_m'$, $b_m'$, and $c_m'$ are the coding parameters representing the frequency value, the chirp rate, and the frequency modulation acceleration rate of the $m^{th}$ sub-pulse, respectively, t" denotes a variable; and there is:

$$c_m' \in [-B, B], b_m' \in \left[-\frac{B}{T_p}, \frac{B}{T_p}\right], a_m' \in \left[-\frac{6B}{T_p^2}, \frac{6B}{T_p^2}\right], m = 1 \ldots, M$$

the relationship between the frequency-modulated coded vector and the coding parameters $a_m'$, $b_m'$, and $c_m'$ is expressed by:

$$\zeta_m = T_p^2 \frac{a_m'}{2} + T_p b_m' + c_m' + \zeta_{m-1}, m = 1, \ldots, M,$$

wherein $T_p$ is the pulse width of the sub-pulse;

integrating the instantaneous frequency function of the signal to obtain the phase of the signal and generate the high freedom parameterized frequency-modulated coded waveform corresponding the selected coding model order;

the high freedom parameterized frequency-modulated coded waveform is expressed by:

$$s_k(t;\zeta) = \exp\left\{j\left(2\pi \int_0^t f_k(t';\zeta) dt' + \theta_k\right)\right\}, k = \{0, 1, 2, 3\}$$

wherein $s_k(t;\zeta)$ denotes the zero-order high freedom parameterized frequency-modulated coded waveform, the first-order high freedom parameterized frequency-modulated coded waveform, the second-order high freedom parameterized frequency-modulated coded waveform, and the hybrid-order high freedom parameterized frequency-modulated coded waveform respectively, when k={0, 1, 2, 3}, $f_k(t';\zeta)$ is the instantaneous frequency function of the high freedom parameterized frequency-modulated coded waveform, and $\theta_k$ is an initial phase value of the high freedom parameterized frequency-modulated coded waveform.

3. The method of claim 2, wherein the method further comprises:
determining, based on a plurality of predicted peak sidelobe ratios corresponding to the candidate sub-pulse counts, a waveform proportion of predicted peak sidelobe ratios smaller than a target peak sidelobe ratio among the plurality of predicted peak sidelobe ratios; and
in response to determining that the waveform proportion is greater than a predetermined proportion, performing at least one round of iterative optimization on the coding model order until an iteration completion condition is met, and obtaining an optimal coding model order, wherein the iteration completion condition includes that the waveform proportion is not greater than the predetermined proportion.

4. The method of claim 1, wherein the pulse model is obtained by a training process including:
dividing a plurality of training samples into a plurality of training datasets based on sample sub-pulse counts of the plurality of training samples, wherein each training sample includes a sample bandwidth, a sample pulse width, a sample time-bandwidth product, a sample coding model order, a sample sub-pulse count, and a sample bandwidth ratio, and a corresponding label is a sample predicted peak sidelobe ratio corresponding to the training sample;
for each training dataset in the plurality of training datasets, determining a learning rate for the training dataset based on the labels of the training samples in the training dataset; and
alternately training the pulse model based on the plurality of training datasets and corresponding learning rates.

5. The method of claim 1, wherein the method further comprises:
determining a target bandwidth based on the bandwidth, the pulse width, the time-bandwidth product, and the coding model order;
determining a proportional relationship between the target bandwidth and a bandwidth of the high freedom parameterized frequency-modulated coded waveform as the bandwidth ratio;
adjusting a parameter range of a coding parameter value based on the bandwidth ratio to determine an updated parameter range;
generating an updated coded waveform based on the updated parameter range;
refreshing a display image of an interactive device to display the high freedom parameterized frequency-modulated coded waveform and the updated coded waveform; and
in response to determining that a waveform difference between the high freedom parameterized frequency-modulated coded waveform and the updated coded waveform is greater than a predetermined difference threshold, adjusting a scanning range of the radar receiver of the radar system based on the waveform difference.

\* \* \* \* \*